United States Patent
Helms et al.

(10) Patent No.: US 9,313,530 B2
(45) Date of Patent: Apr. 12, 2016

(54) TECHNIQUE FOR SECURELY COMMUNICATING PROGRAMMING CONTENT

(71) Applicant: Time Warner Cable Inc., New York, NY (US)

(72) Inventors: William Helms, Longmont, CO (US); John B. Carlucci, Boulder, CO (US); Michael T. Hayashi, Evergreen, CO (US); John W. Fahrny, Parker, CO (US)

(73) Assignees: TIME WARNER CABLE ENTERPRISES LLC, San Diego, CA (US); COMCAST CABLE HOLDINGS, LLC, Philadelphia, PA (US)

( * ) Notice: Subject to any disclaimer, the term of this patent is extended or adjusted under 35 U.S.C. 154(b) by 0 days.

(21) Appl. No.: 13/674,866

(22) Filed: Nov. 12, 2012

(65) Prior Publication Data

US 2013/0104162 A1    Apr. 25, 2013

Related U.S. Application Data

(60) Division of application No. 11/006,404, filed on Dec. 7, 2004, now Pat. No. 8,312,267, which is a continuation-in-part of application No. 10/894,884, filed on Jul. 20, 2004, now Pat. No. 8,266,429.

(51) Int. Cl.
*H04L 29/06* (2006.01)
*H04N 21/2347* (2011.01)
(Continued)

(52) U.S. Cl.
CPC .......... *H04N 21/23473* (2013.01); *G06F 21/10* (2013.01); *H04L 9/0825* (2013.01);
(Continued)

(58) Field of Classification Search
CPC ............. H04L 9/0825; H04L 2209/60; H04N 21/2347
See application file for complete search history.

(56) References Cited

U.S. PATENT DOCUMENTS

| 5,369,707 A | 11/1994 | Follendore, III |
| 5,528,284 A | 6/1996 | Iwami et al. |

(Continued)

FOREIGN PATENT DOCUMENTS

| EP | 1139198 | 10/2001 |
| GB | 2381709 A | 5/2003 |

(Continued)

OTHER PUBLICATIONS

Digital Video Broadcasting (DVB); DVB SimulCrypt; Part 1: "Head-end architecture and synchronization" Technical Specification—ETSI TS 101 197 V1.2.1 (Feb. 2002), 40 pages.

(Continued)

*Primary Examiner* — Dao Ho
(74) *Attorney, Agent, or Firm* — Gazdzinski & Associates, PC

(57) ABSTRACT

Technique for securely transferring programming content from a first device in a first layer to a second device in a second layer. Upon request to transfer protected content to the second device, the first device authenticates the second device. After authentication, the first device transfers the protected content and a rights file associated therewith to the second device. The rights file specifies the rights of the second device to use the protected content, according to its security level. These rights may concern, the number of times that the second device may subsequently transfer the protected content to other devices, the time period within which the second device may play the protected content, etc. The higher the security level of the second device is, the more rights accorded thereto. The second device may further need to meet a minimum security level in order for it to receive the protected content.

17 Claims, 18 Drawing Sheets

(51) Int. Cl.
*G06F 21/10* (2013.01)
*H04L 9/08* (2006.01)
*H04L 9/32* (2006.01)
*H04N 7/167* (2011.01)
*H04N 7/173* (2011.01)
*H04N 21/254* (2011.01)
*H04N 21/258* (2011.01)
*H04N 21/266* (2011.01)
*H04N 21/4405* (2011.01)
*H04N 21/4627* (2011.01)
*H04N 21/6334* (2011.01)
*H04N 21/6377* (2011.01)
*H04N 21/658* (2011.01)
*H04N 21/8355* (2011.01)

(52) U.S. Cl.
CPC ............ *H04L9/3263* (2013.01); *H04N 7/1675* (2013.01); *H04N 7/17318* (2013.01); *H04N 7/17354* (2013.01); *H04N 21/2347* (2013.01); *H04N 21/2541* (2013.01); *H04N 21/25816* (2013.01); *H04N 21/26613* (2013.01); *H04N 21/4405* (2013.01); *H04N 21/4627* (2013.01); *H04N 21/6334* (2013.01); *H04N 21/63775* (2013.01); *H04N 21/6582* (2013.01); *H04N 21/8355* (2013.01); *G06F 2221/2137* (2013.01); *H04L 2209/60* (2013.01)

(56) References Cited

U.S. PATENT DOCUMENTS

| | | |
|---|---|---|
| 5,577,209 A | 11/1996 | Boyle et al. |
| 5,708,961 A | 1/1998 | Hylton et al. |
| 5,715,403 A | 2/1998 | Stefik |
| 5,787,172 A | 7/1998 | Arnold |
| 5,818,438 A | 10/1998 | Howe et al. |
| 5,828,832 A | 10/1998 | Holden et al. |
| 5,870,474 A | 2/1999 | Wasilewski et al. |
| 5,897,635 A | 4/1999 | Torres et al. |
| 5,982,412 A | 11/1999 | Nulty |
| 6,009,103 A | 12/1999 | Woundy |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,181,697 B1 | 1/2001 | Nurenberg et al. |
| 6,212,636 B1 | 4/2001 | Boyle et al. |
| 6,219,710 B1 | 4/2001 | Gray et al. |
| 6,233,341 B1 | 5/2001 | Riggins |
| 6,233,687 B1 | 5/2001 | White |
| 6,256,393 B1 * | 7/2001 | Safadi et al. ................. 380/232 |
| 6,259,701 B1 | 7/2001 | Shur et al. |
| 6,266,421 B1 | 7/2001 | Domyo et al. |
| 6,456,716 B1 | 9/2002 | Arnold |
| 6,519,062 B1 | 2/2003 | Yoo |
| 6,523,696 B1 | 2/2003 | Saito et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,694,145 B2 | 2/2004 | Riikonen et al. |
| 6,742,116 B1 | 5/2004 | Matsui et al. |
| 6,760,768 B2 | 7/2004 | Holden et al. |
| 6,782,550 B1 | 8/2004 | Cao |
| 6,785,810 B1 | 8/2004 | Lirov et al. |
| 6,788,676 B2 | 9/2004 | Partanen et al. |
| 6,807,573 B2 | 10/2004 | Saito et al. |
| 6,813,505 B2 | 11/2004 | Walley et al. |
| 6,859,535 B1 | 2/2005 | Tatebayashi et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,975,730 B1 | 12/2005 | Kuroiwa et al. |
| 6,985,355 B2 | 1/2006 | Allirot |
| 6,996,544 B2 | 2/2006 | Sellars |
| 7,006,881 B1 | 2/2006 | Hoffberg et al. |
| 7,009,972 B2 | 3/2006 | Maher et al. |
| 7,016,963 B1 | 3/2006 | Judd et al. |
| 7,017,189 B1 | 3/2006 | De Mello |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,068,639 B1 | 6/2006 | Varma et al. |
| 7,069,449 B2 | 6/2006 | Weaver et al. |
| 7,072,950 B2 | 7/2006 | Toft |
| 7,073,199 B2 | 7/2006 | Raley |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,149,772 B1 | 12/2006 | Kalavade |
| 7,154,912 B2 | 12/2006 | Chong et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,237,112 B1 | 6/2007 | Ishiguro et al. |
| 7,242,960 B2 | 7/2007 | Van Rooyen et al. |
| 7,254,608 B2 | 8/2007 | Yeager et al. |
| 7,257,227 B2 | 8/2007 | Chen et al. |
| 7,266,726 B1 | 9/2007 | Ladd |
| 7,289,534 B1 | 10/2007 | Bailey et al. |
| 7,299,502 B2 | 11/2007 | Schmeling et al. |
| 7,305,460 B2 | 12/2007 | Park |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,373,506 B2 | 5/2008 | Asano et al. |
| 7,376,386 B2 | 5/2008 | Phillips et al. |
| 7,409,546 B2 | 8/2008 | Platt |
| 7,457,520 B2 | 11/2008 | Rosetti et al. |
| 7,486,869 B2 | 2/2009 | Alexander et al. |
| 7,506,367 B1 | 3/2009 | Ishibashi |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,865,440 B2 | 1/2011 | Jaquette |
| 7,925,592 B1 | 4/2011 | Issa et al. |
| 7,954,131 B2 | 5/2011 | Cholas et al. |
| 7,983,418 B2 | 7/2011 | Oyama et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La Joie et al. |
| 8,332,370 B2 | 12/2012 | Gattegno et al. |
| 2001/0004768 A1 | 6/2001 | Hodge et al. |
| 2001/0014946 A1 | 8/2001 | Ichinoi |
| 2001/0019614 A1 | 9/2001 | Madoukh |

(56) References Cited

U.S. PATENT DOCUMENTS

| | | |
|---|---|---|
| 2001/0029581 A1 | 10/2001 | Knauft |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0066033 A1 | 5/2002 | Dobbins et al. |
| 2002/0077984 A1 | 6/2002 | Ireton |
| 2002/0126654 A1 | 9/2002 | Preston et al. |
| 2002/0129358 A1 | 9/2002 | Buehl et al. |
| 2002/0147771 A1 | 10/2002 | Traversat et al. |
| 2002/0152299 A1 | 10/2002 | Traversat et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0009681 A1 | 1/2003 | Harada et al. |
| 2003/0021421 A1 | 1/2003 | Yokota et al. |
| 2003/0041336 A1 | 2/2003 | Del Sordo et al. |
| 2003/0046560 A1 | 3/2003 | Inomata et al. |
| 2003/0048380 A1 | 3/2003 | Tamura |
| 2003/0056217 A1 | 3/2003 | Brooks |
| 2003/0069965 A1 | 4/2003 | Ma et al. |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0115267 A1 | 6/2003 | Hinton et al. |
| 2003/0140227 A1 | 7/2003 | Asano et al. |
| 2003/0163697 A1 | 8/2003 | Pabla et al. |
| 2003/0165241 A1 | 9/2003 | Fransdonk |
| 2003/0166401 A1 | 9/2003 | Combes et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133923 A1 | 7/2004 | Watson et al. |
| 2004/0137918 A1 | 7/2004 | Varonen et al. |
| 2004/0181800 A1 | 9/2004 | Rakib et al. |
| 2004/0193680 A1 | 9/2004 | Gibbs et al. |
| 2004/0224425 A1 | 11/2004 | Gjerde et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0065888 A1* | 3/2005 | Benaloh .................... 705/51 |
| 2005/0086683 A1 | 4/2005 | Meyerson |
| 2005/0097006 A1 | 5/2005 | Nyako |
| 2005/0108763 A1 | 5/2005 | Baran et al. |
| 2005/0114900 A1 | 5/2005 | Ladd et al. |
| 2005/0138357 A1 | 6/2005 | Swenson et al. |
| 2005/0169468 A1 | 8/2005 | Fahrny et al. |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0278259 A1 | 12/2005 | Gunaseelan et al. |
| 2005/0289618 A1 | 12/2005 | Hardin |
| 2006/0002551 A1 | 1/2006 | Brown et al. |
| 2006/0008256 A1 | 1/2006 | Khedouri et al. |
| 2006/0020786 A1 | 1/2006 | Helms |
| 2006/0020950 A1 | 1/2006 | Ladd |
| 2006/0021004 A1 | 1/2006 | Moran et al. |
| 2006/0036750 A1 | 2/2006 | Ladd |
| 2006/0041903 A1 | 2/2006 | Kahn et al. |
| 2006/0047801 A1 | 3/2006 | Haag et al. |
| 2006/0047957 A1 | 3/2006 | Helms |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder |
| 2006/0130113 A1 | 6/2006 | Carlucci |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0149850 A1 | 7/2006 | Bowman |
| 2006/0161635 A1 | 7/2006 | Lamkin et al. |
| 2006/0168219 A1 | 7/2006 | Ahluwalia et al. |
| 2006/0179138 A1 | 8/2006 | Van Gassel et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0079381 A1 | 4/2007 | Hartung et al. |
| 2007/0094691 A1 | 4/2007 | Gazdzinski |
| 2007/0098178 A1 | 5/2007 | Raikar |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0204314 A1 | 8/2007 | Hasek |
| 2007/0206799 A1 | 9/2007 | Wingert et al. |
| 2007/0209059 A1 | 9/2007 | Moore et al. |
| 2007/0217436 A1 | 9/2007 | Markley |
| 2007/0219910 A1 | 9/2007 | Martinez |
| 2007/0220024 A1 | 9/2007 | Putterman et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0276925 A1 | 11/2007 | LaJoie |
| 2007/0276926 A1 | 11/2007 | LaJoie et al. |
| 2008/0008321 A1 | 1/2008 | Gagnon et al. |
| 2008/0008371 A1 | 1/2008 | Woods et al. |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms |
| 2008/0103976 A1 | 5/2008 | Read et al. |
| 2008/0103977 A1 | 5/2008 | Khosravy et al. |
| 2008/0112405 A1 | 5/2008 | Cholas et al. |

(56) References Cited

U.S. PATENT DOCUMENTS

| | | |
|---|---|---|
| 2008/0117920 A1 | 5/2008 | Tucker |
| 2008/0123862 A1 | 5/2008 | Rowley |
| 2008/0133551 A1 | 6/2008 | Wensley et al. |
| 2008/0148362 A1 | 6/2008 | Gilder et al. |
| 2008/0155059 A1 | 6/2008 | Hardin et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0212945 A1 | 9/2008 | Khedouri et al. |
| 2008/0222684 A1 | 9/2008 | Mukraj et al. |
| 2008/0235746 A1 | 9/2008 | Peters et al. |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0031371 A1 | 1/2009 | Munsell et al. |
| 2009/0083813 A1 | 3/2009 | Dolce et al. |
| 2009/0098861 A1 | 4/2009 | Kalliola et al. |
| 2009/0100459 A1 | 4/2009 | Riedl et al. |
| 2009/0102983 A1 | 4/2009 | Malone et al. |
| 2009/0151006 A1 | 6/2009 | Saeki et al. |
| 2009/0182815 A1 | 7/2009 | Czechowski, III et al. |
| 2009/0185576 A1 | 7/2009 | Kisel et al. |
| 2009/0201917 A1 | 8/2009 | Maes et al. |
| 2009/0210912 A1 | 8/2009 | Cholas et al. |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0293101 A1 | 11/2009 | Carter et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0131973 A1 | 5/2010 | Dillon et al. |
| 2010/0138900 A1 | 6/2010 | Peterka et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0313225 A1 | 12/2010 | Cholas et al. |
| 2010/0313226 A1 | 12/2010 | Cholas et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | LaJoie et al. |
| 2011/0164753 A1 | 7/2011 | Dubhashi et al. |
| 2011/0169977 A1 | 7/2011 | Masuda |
| 2011/0213688 A1 | 9/2011 | Santos et al. |
| 2011/0219229 A1 | 9/2011 | Cholas et al. |
| 2012/0008786 A1 | 1/2012 | Cronk et al. |
| 2012/0011567 A1 | 1/2012 | Cronk et al. |
| 2012/0291062 A1 | 11/2012 | Pearson et al. |
| 2014/0283137 A1 | 9/2014 | Rebaud et al. |

FOREIGN PATENT DOCUMENTS

| | | |
|---|---|---|
| JP | A-8-263440 | 11/1996 |
| JP | A-2000-156676 | 6/2000 |
| JP | A-2000-332746 | 11/2000 |
| JP | 2001243707 A | 9/2001 |
| JP | 2001274788 A | 10/2001 |
| JP | A-2001-274786 | 10/2001 |
| JP | A-2001-285821 | 10/2001 |
| JP | A-2002-163396 | 6/2002 |
| JP | A-2002-352094 | 6/2002 |
| JP | A-2003-58657 | 2/2003 |
| JP | A-2003-162600 | 6/2003 |
| JP | A-2003-233690 | 8/2003 |
| JP | A-2003-248508 | 9/2003 |
| JP | A-2003-296484 | 10/2003 |
| JP | A-2003-348508 | 12/2003 |
| JP | A-2004-72721 | 3/2004 |
| JP | 2004120738 A | 4/2004 |
| JP | A-2004-120736 | 4/2004 |
| JP | 2004-030111 | 10/2004 |
| JP | A-2004-303111 | 10/2004 |
| JP | A-2005-506627 | 3/2005 |
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2008005047 A | 1/2008 |
| JP | 2008015936 A | 1/2008 |
| JP | 2008021293 A | 1/2008 |
| JP | 2008-507905 | 3/2008 |
| JP | 2008167018 A | 7/2008 |
| JP | 2008206039 A | 9/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO 01/03410 | 1/2001 |
| WO | WO-0110125 A1 | 2/2001 |
| WO | WO 01/37479 | 5/2001 |
| WO | WO/01/69842 | 9/2001 |
| WO | WO 01/77778 | 10/2001 |
| WO | WO-0213032 A1 | 2/2002 |
| WO | WO 02/21841 | 3/2002 |
| WO | WO 02/42966 | 5/2002 |
| WO | WO-02080556 A1 | 10/2002 |
| WO | WO-03038704 A1 | 5/2003 |
| WO | WO 03/187799 | 10/2003 |
| WO | WO 03/093944 | 11/2003 |
| WO | WO 2004/027622 | 4/2004 |
| WO | WO-2005015422 A1 | 2/2005 |
| WO | WO/2006-020141 | 2/2006 |
| WO | WO-2009020476 A2 | 2/2009 |
| WO | WO-2012021245 A1 | 2/2012 |

OTHER PUBLICATIONS

Federal Information Processing Standards Publication, US FIPS PUB 197, Nov. 26, 2001, "Advanced Encryption Standards (AES)," 47 pages.

DCAS Authorized Service Domain, Version 1.2, dated Nov. 4, 2008, 54 pages.

DCAS Licensed Specification Abstracts, CableLabs Confidential Information, Jan. 12, 2006, 4 pages.

Digital Rights Management, Technical White Paper, Alcatel Telecommunications Review, 2.sup.nd Quarter 2003, 8 pages.

A Flexible Content Protection System for Media-on-Demand. By Jian Zhang, et al., IBM China Research Lab. Proceedings of the IEEE Fourth International Symposium on Multimedia Software Engineering (MSE'02), 6 pages.

RealSystem Media Commerce Suite Technical White Paper, . Copyrgt. 2001 RealNetworks, Inc., 16 pages, http://www.realnetworks.com.

5C Digital Transmission Content Protection White Paper, Hitachi, Ltd., et al., dated Jul. 14, 1998, 15 pages.

High-bandwidth Digital Content Protection System, Revision 1.091, dated Apr. 22, 2003, Digital Content Protection LLC Draft, 78 pages.

RealSystem Media Commerce Suite (Technical White Paper), at http://docs.real.com/docs/drm/DRM.sub.--WP1.pdf, 12 pages, Nov. 2001.

Bostjan Marusic et al. "Share it!—Content Transfer in Home-to-Home Networks." IEEE MELECON 2004, May 12-15, 2004, Dubrovnik, Croatia.

(56) References Cited

OTHER PUBLICATIONS

'OCAP 2.0 Profile, OC-SP-OCAP2.0-101-020419', Apr. 19, 2002, Cable Television Laboratories, Inc. article 'OpenCable Application Platform Specification'.

'OC-SP-HOSR-CFR-113-030707', Jul. 7, 2003, Cable Television Laboratories, Inc. article 'OpenCableTm Host Device Core Functional Requirements'.

'OC-SP-HOSTPOD-IF-113-030707', Jul. 7, 2003, Cable Television Laboratories, Inc. article 'OpenCableTm HOST-POD Interface Specification'.

Van Moffaret, et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.

DVB (Digital Video Broadcasting), DVB Document A045 Rev. 3, Jul. 2004, "Head-end Implementation of SimulCrypt," 289 pages.

Cantor S., et al., "Bindings for the OASIS Security Assertion Markup Language (SAML)," V2.0. OASIS Standard, Mar. 2005, Document ID saml-bindings-2.0-os.

Extended European Search Report for Application No. EP05848363, mailed on Aug. 26, 2009, 9 pages.

Extended European Search Report for Application No. EP12151109, mailed on May 23, 2014, 9 pages.

International Search Report for Application No. PCT/US05/44537, mailed on Aug. 8, 2008, 1 pages.

Media Server; 1 Device Template Version 1.01 Jun. 25, 2002.

OpenCable Application platform specification OCAP Extension—OACP Home Networking Extension 0C-SP-OCAP-HNEXT-103-080418, 2005-2008.

OpenCable Specification Home Networking 2.0 0C-Sp-HNP2.0 101-08418, 2007.

OpenCableTM Specifications Home Networkmg, Home Networking Security Specification; OC-SP-HN-DO1-081027 (Oct. 27, 2008).

Security Assertion Markup language (SAML) Specification (Version 2.0 released in 2005), as SAML Core: S Cantor et al. Assertions and Protocols for the OASIS Security Assertion Markup Language (SAML) V2.0. OASIS Standard, Mar. 2005. Document ID saml-core-2 .0-os (http://docs.oasis-open.org/securit/saml/v2.0/saml-core-2.0-os.pdf).

Written Opinion for Application No. PCT/US05/44537, mailed on Aug. 8, 2008, 3 pages.

Zhang, et al. ("A flexible content protection system for media-on-demand" Multimedia Software Engineering, 2002 Proceedings. Fourth International Symposium on Dec. 11-13, 2002, Piscataway, NJ, USAA, IEEE, Dec. 11, 2002, pp. 272-277, XP010632760ISBN: 978-0-7695-1857-2; hereinafter "Zhang").

\* cited by examiner

| 360 | |
|---|---|
| STID (363) | SUBSCRIBER ID (364) |
| MAC-1 | S-1 |
| MAC-2 | S-1 |
| MAC-3 | S-2 |

368-1 → row (MAC-1, S-1)
368-2 → row (MAC-2, S-1)

FIG. 2

| 273 | |
|---|---|
| STID (276) | DEVICE PUBLIC KEY (277) |
| MAC-1 | DPUBKEY-1 |
| MAC-2 | DPUBKEY-2 |
| MAC-3 | DPUBKEY-3 |
| ⋮ | ⋮ |
| MAC-M | DPUBKEY-M |

279-1 → row (MAC-1, DPUBKEY-1)

FIG. 3

| | 283 | |
|---|---|---|
| 286 | 287 | 288 |
| SUBSCRIBER ID | SUBSCRIBER PUBLIC KEY | SUBSCRIBER PRIVATE KEY |
| S-1 | SPUBKEY-1 | SPRIKEY-1 |
| S-2 | SPUBKEY-2 | SPRIKEY-2 |
| S-3 | SPUBKEY-3 | SPRIKEY-3 |

289-1

| 601 | 602 | 603 | 604 |
|---|---|---|---|
| ENCRYPTED RIGHTS FILE | ENCRYPTED CONTENT FILE | ENCRYPTED CONTENT KEY V-1 | ENCRYPTED CONTENT KEY V-2 |

MEDIA FILE
606

1550

| | | |
|---|---|---|
| 5100 | CONTENT TYPE | MOVIE |
| 5110 | TITLE | CITIZEN KANE |
| 5120 | ACTORS | ORSON WELLES,... |
| | ⋮ | ⋮ |
| 5190 | STT TRANSFER RIGHTS | 2,3 |
| | ⋮ | ⋮ |
| | SECURITY LEVEL 1 | |
| 5210 | TRANSFER RIGHTS | NONE |
| 5220 | PLAY TIME | ZERO |
| 5230 | # TRANSFERS LIMIT | ZERO |
| | ⋮ | ⋮ |
| | SECURITY LEVEL 2 | |
| 5310 | TRANSFER RIGHTS | 2, 3 |
| 5320 | PLAY TIME | 72 HOURS |
| 5330 | # TRANSFERS LIMIT | 3 |
| | ⋮ | ⋮ |
| | SECURITY LEVEL 3 | |
| 5410 | TRANSFER RIGHTS | 3 |
| 5420 | PLAY TIME | UNLIMITED |
| 5430 | # TRANSFERS LIMIT | UNLIMITED |
| | ⋮ | ⋮ |

| | | |
|---|---|---|
| 1730 | CONTENT TYPE | MOVIE |
| 1731 | TITLE | CITIZEN KANE |
| 1732 | ACTORS | ORSON WELLES,... |
| | ⋮ | ⋮ |
| 1756 | TRANSFER RIGHTS | 2,3 |
| 1758 | PLAY TIME | 72 HOURS |
| 1759 | # TRANSFERS LIMIT | 3 |
| | ⋮ | ⋮ |
| 1772 | DATE/TIME RECEIVED | 11/24/YYYY    4:23 P.M. |
| 1773 | END TIME LIMIT | 11/27/7777    4:23 P.M. |
| 1776 | TRANSFERS COUNT | 0 |
| | ⋮ | ⋮ |

FIG. 15

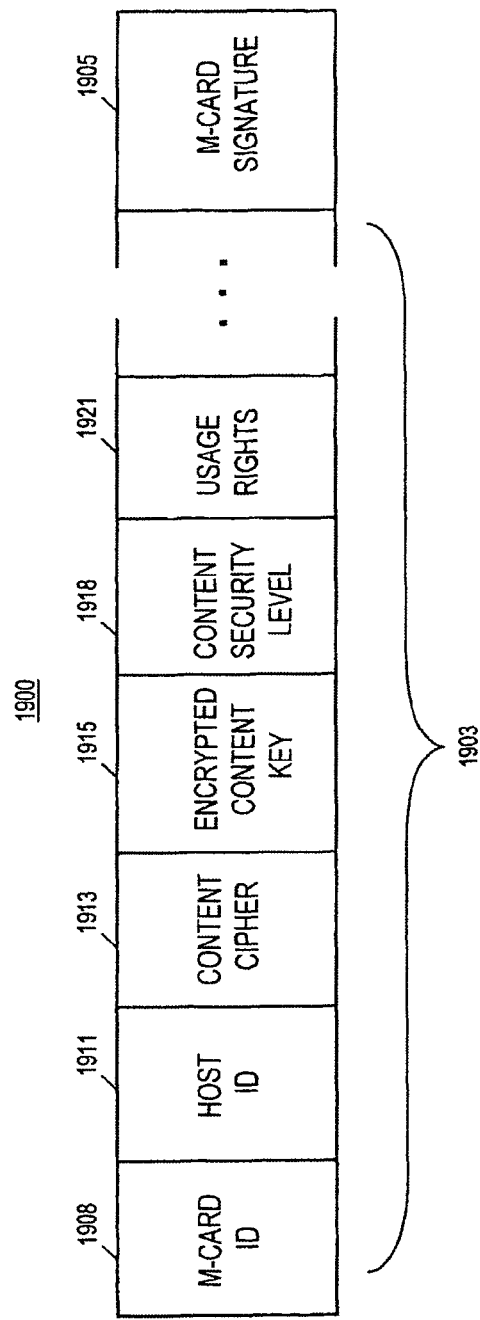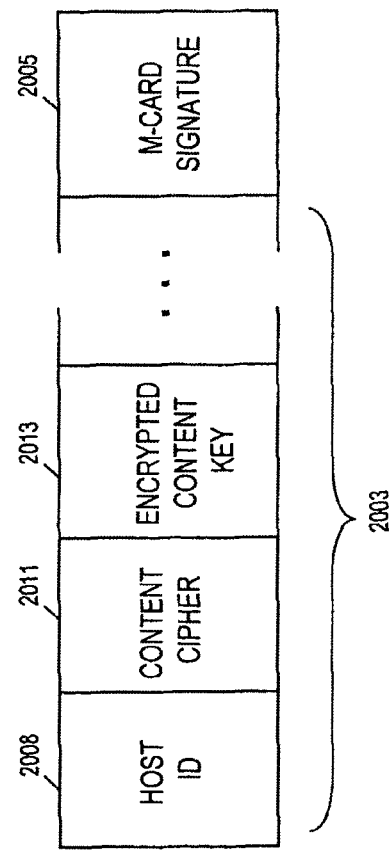

TECHNIQUE FOR SECURELY COMMUNICATING PROGRAMMING CONTENT

PRIORITY

The present application is a divisional of U.S. patent application Ser. No. 11/006,404 of the same title, filed on Dec. 7, 2004, and issuing as U.S. Pat. No. 8,312,267 on Nov. 13, 2012, which is a continuation-in-part of U.S. patent application Ser. No. 10/894,884, filed on Jul. 20, 2004, and which issued as U.S. Pat. No. 8,266,429 on Sep. 9, 2012, each of which is incorporated herein by reference in its entirety.

FIELD OF THE INVENTION

The invention relates to a communications technique, and more particularly to a technique for securely communicating programming material originating in a cable TV network to a device outside the network.

BACKGROUND OF THE INVENTION

A set-top terminal (STT) serves as a gateway between a user's television and a cable TV network delivering programming content. Such programming content may be delivered as a broadcast. It may also be delivered on an on-demand basis, for which services such as video on demand (VOD), subscription VOD, movies on demand, etc., are offered. In addition, a "network personal video recorder (NPVR)" service has been developed, allowing the user to perform trick mode functions (rewind, fast-forward, pause, etc.) on a presentation of programming content through use of a network. In fact, a network architecture and functionalities for implementing the NPVR service are described, e.g., in International Publication Number WO 2003/093944 published on Nov. 13, 2003. The NPVR service also allows a user to "reserve" past and future programs for his/her review, even if such reserved programs were not identified by the user before their broadcast.

An STT receives, through the cable TV network, programming content which may be encrypted, e.g., in accordance with the data encryption standard (DES) technique, to secure its delivery. DES is a well known symmetrical cipher which utilizes a single key for both encryption and decryption of messages. Because the DES algorithm is publicly known, learning the DES key would allow an encrypted message to be read by anyone. As such, both the message sender and receiver must keep the DES key a secret from others. A DES key typically is a sequence of eight bytes, each containing eight bits. To enhance the DES integrity, the DES algorithm may be applied successive times. With this approach, the DES algorithm enciphers and deciphers data, e.g., three times in sequence, using multiple keys, resulting in a so-called triple DES (3DES) technique.

In contrast to the DES technique, a public key encryption technique, e.g., an RSA technique (named for its developers, Rivest, Shamir, and Adleman), uses two different keys. A first key, referred to as a private key, is kept secret by a user. The other key, referred to as a public key, is available to anyone wishing to communicate with the user in a confidential manner. The two keys uniquely match each other, collectively referred to as a "public key-private key pair." However, the private key cannot be easily derived from the public key. A party wishing to send a message to the user may utilize the public key to encrypt a message before transmitting it. The user then utilizes the private key to decrypt the message. Conversely, the private key may be used to encrypt a message, in which case the message can subsequently be decrypted with the public key. For example, the keys for the RSA algorithm are mathematically generated, in part, by combining prime numbers. The security of the RSA algorithm, and the like, depends on the use of very large numbers for its keys, which typically are 512 bits long.

Public key encryption methodologies may often be utilized for authentication purposes. For example, a first party wishing to authenticate a data file may apply a well-known hash function (such as the SHA-1 algorithm) to the file, producing a hash value, and encode the hash value using its private key, producing an encoded value. An encoded value generated in this manner is sometimes referred to as a digital signature. The first party transmits the data file, and the digital signature, to a second party. The second party may then utilize the first party's known public key to decode the digital signature, generating a decoded value. The second party additionally applies the known hash function to the data file received from the first party, generating a verification value. The decoded value is compared with the verification value; if the decoded value and the verification value match, the first party may be confident of the sender's identity.

The authentication technique described above is useful when the second party has knowledge of the first party's public key. However, in many instances, the second party may not have such knowledge, and therefore cannot perform the steps necessary to authenticate the first party's identity. A common solution to this problem is to use a registration message issued by a commonly-known, trusted entity. A registration message may be, for example, a digital certificate generated in accordance with the ISO/X.509 standards published by the International Organization for Standardization. A registration message has value if both the first and second parties trust the trusted entity and have knowledge of the trusted entity's public key. In such case, the first party may generate an "unsigned" message containing its public key, and provide the message to the trusted entity with a request that the trusted entity "sign" the message. The trusted entity applies a well-known hash function to all or a portion of the message, and uses its private key to encode the resulting hash value, generating a digital signature. The trusted entity appends the signature to the message, and returns the resulting registration message to the first party. The first party may subsequently provide the signed registration message to a second party, who utilizes the trusted entity's public key to verify the registration message and extract the first party's public key therefrom. A trusted entity which issues registration messages in the manner described above is sometimes referred to as a "trusted licensing authority."

A licensing "hierarchy" may also be established with a trusted licensing authority as the highest (and trusted) authority. In a system using such a licensing hierarchy, a party may be required to maintain multiple registration messages establishing a chain of authority up to the licensing authority. To authenticate its identity, a party provides to the second party as many registration messages as is necessary to demonstrate that its identity is recognized within the licensing hierarchy.

In prior art, programming content may be encrypted using a DES key, in accordance with a DES algorithm, to secure its delivery from a headend of a cable TV system to an STT. In order for the STT to decrypt the encrypted programming content, the DES key is transmitted from the headend to the STT in an entitlement control message (ECM), which is encrypted using a 3DES key in accordance with a 3DES algorithm. The 3DES key (also known as a "multi-session key (MSK)") is sent to the STT in a separate entitlement management message (EMM), which is encrypted using an STT public key in accordance with a public key algorithm, whose private key counterpart is securely maintained in the STT. Thus, after receiving the encrypted EMM and ECM, the STT decrypts the encrypted EMM using the STT private key to obtain the 3DES key therein. Using such a 3DES key, the STT decrypts the encrypted ECM to obtain the DES key therein. Using such a DES key, the STT can decrypt the encrypted programming content it received.

Recently, some STTs for cable TV were improved to incorporate digital video recorder (DVR) functions ("DVR STTs"). Like a DVR, e.g., a Tivo or ReplayTV device, a DVR STT typically includes a hard drive, e.g., a disk, for digitally recording TV programs. Also like a DVR, a DVR STT allows a cable TV subscriber to record his/her favorite TV programs for later review, and exercise a season-pass-like option to record every episode of his/her favorite program for a period. It may automatically record programs for the user based on his/her viewing habit and preferences. The presentation of the recorded programming content can be manipulated by exercising rewind, pause and fast-forward functions.

However, cable operators have observed that providing to subscribers unrestricted recording of content might result in an unacceptable amount of unauthorized copying and/or distribution. Accordingly, there is a continuing need for a strategy that allows content to be stored by a subscriber, but at the same time prevents (or controls) copying and distributing the content to unauthorized parties. A number of techniques have been developed to address this need. One such technique involves use of an indicator, e.g., an encryption mode indicator (EMI), which may be inserted into a data stream used to transmit content from a source device to a destination device. The EMI provides to the destination device information concerning the status of the content; the status may indicate that the content can be freely copied, copied once, never copied, etc. The destination device reads the EMI and determines whether or not the content may be copied. If copying is permitted, the destination device may then copy the content. For details on such a content protection technique, one may refer to: "5C Digital Transmission Content Protection White Paper," Hitachi, Ltd et al., Revision 1.0, Jul. 14, 1998.

Another technique requires a device intending to transmit protected content to determine whether or not the receiving device is authorized to receive such content. One such technique is disclosed in "High-Bandwidth Digital Content Protection System," Digital Content Protection LLC, Revision 1.1, Jun. 9, 2003. In accordance with the disclosed technique, both the transmitting device and the receiving device have a valid array of secret device keys and a corresponding key selection vector. During an authentication process, the two devices exchange key selection vectors. The receiving device uses the transmitting device's key selection vector to generate a selection of its own secret device keys, and then calculates a value Km by adding the selected secret device keys using 56-bit binary addition. The transmitting device calculates a corresponding value Km' using the receiving device's key selection vector. If each device has a valid set of secret device keys, Km=Km'. Only after the receiving device has established its legitimacy does the transmitting device deliver the content.

Another strategy used to control the usage and distribution of protected content is to employ a digital rights management (DRM) system. An example of a DRM system is the Microsoft Windows Media digital rights management system (MS-DRM). According to this system, a digital media file is encrypted and locked with a "license key." The license key is stored in a license file which is distributed separately from the media file. A customer may obtain the encrypted media file by, e.g., downloading it from a web site, purchasing it on a disk, etc. To play the digital media file, the customer must first acquire the license file containing the corresponding license key. The customer acquires the license key by accessing a pre-delivered license; alternatively, when the customer plays the file for the first time, a procedure is activated for retrieving the license via the Internet. After obtaining the license with the license key, the customer can play the media file according to the rules or rights specified in the license.

Another example of a DRM system is described in "Real-System Media Commerce Suite (Technical. White Paper)," which is incorporated herein by reference in its entirety. A content file is encrypted by the system operator to become a secured content file, requiring a key to play the content in the file. The key is imported into a retailer's database, and the secured content file is provided to consumers by, e.g., offline distribution of CDs. The retailer sets usage rules for licensing content. A customer obtains the secured content file and contacts the retailer's web server through a trusted client to obtain a license to play the content. The retailer's web server requests rights from the operator's license server, which creates a license containing the key for the respective content file, and provides the license to the retailer's web server. The retailer's web server delivers the license to the trusted client. The trusted client receives the license with the key, retrieves the content file, and uses the key to play the content.

In recent years, numerous systems for providing interconnectivity among devices in a home have been developed, allowing home networks to include cable STTs, personal computers, cellphones, PDA devices, etc. An example of a system for interconnecting various devices in a home is described in International Publication No. WO 02/21841, published on Mar. 14, 2003. Because of the increasing popularity of home networking, there is a growing need for a strategy that enables a user to perform authorized transfer of protected content, e.g., transferring content from an STT to a second device in a home network, and at the same time prevents unauthorized distribution of the protected content.

In addition, in the cable industry, a CableCARD (also known as a "a point-of-deployment (POD) module") has been developed to satisfy certain security requirements to allow retail availability of host devices, e.g., set-top boxes, digital cable ready televisions, DVRs, personal computers (PCs), integrated digital televisions, etc., for receiving cable services. The CableCARD, comprising a PCMCIA device, can be inserted into a host device, allowing a viewer to receive cable systems' secure digital video services, e.g., pay per view TV, electronic program guides, premium subscription channels, etc.

Specifically, the CableCARD contains conditional access functionality, as well as the capability of converting messages to a common format. Thus, the CableCARD provides a cable operator with a secure device at the subscriber premises, and acts as a translator so that the host device needs to understand a single protocol, regardless of the type of the network to which it is connected.

For example, with the CableCARDs provided by cable operators, host devices which run, e.g., on an OpenCable Applications Platform (OCAP), may be sold in retail outlets. (For details on such a platform, one may refer, e.g., to: "Open-Cable Application Platform Specification," OCAP 2.0 Profile, OC-SP-OCAP2.0401-020419, Cable Television Laboratories, Inc., Apr. 19, 2002.) The OCAP allows applications to be built to a common middleware layer for deployment on host devices interoperable across cable systems in North America. (For details on the functional requirements of one such host device, one may refer, e.g., to: "OpenCable™ Host Device Core Functional Requirements," OC-SP-HOSR-CFR-I13-030707, Cable Television Laboratories, Inc., Jul. 7, 2003.) With a common interface to the CableCARD, a host can be moved from one place to another, provided that the user of the host device contact his/her new cable operator to obtain a new CableCARD. (For details on such an interface, one may refer, e.g., to: "OpenCable™ HOST-POD Interface Specification," OC-SP-HOSTPOD-IF-I13-030707, Cable Television Laboratories, Inc. Jul. 7, 2003. To provision a new CableCARD and host device, an initialization and authorization process needs to be performed while the host device, with the CableCARD inserted therein, is connected to the cable network. The initialization and authorization process begins with the user's providing an ID(s) of the CableCARD and/or the host device (e.g., serial number(s)) to the cable operator. The cable operator looks up in a database a MAC address of the CableCARD which typically is hard-coded in the Cable-CARD, and is associated with the CableCARD ID. During the authorization process, the cable operator may, for example, assign an IP address to the CableCARD for its identification in the cable network. The cable operator may also collect from the host device data concerning the make, model, and ID of the host device (e.g., its serial number). The cable operator may associate the CableCARD's MAC address (and/or LP address) with the user information, e.g., his/her name, address, etc. for billing purposes.

SUMMARY OF THE INVENTION

The invention overcomes the prior art limitations by instituting a multi-layered rights arrangement to prevent unauthorized use and transfer of protected content, especially in a home network. For example, in accordance with the invention, the home network may be considered to comprise multiple layers. One such layer may be a "trusted domain," described in aforementioned U.S. application Ser. No. 10/894,884, filed on Jul. 20, 2004. For example, in a cable TV system, the trusted domain includes not only the system portion where programming content traditionally is secured by, and within total control of, a cable operator, including, e.g., the headend, delivery network, etc., but also user devices, e.g., STTs, at subscribers' premises which are capable of receiving and securely storing programming content in a prescribed manner. The cable operator can control certain subscriber access and usage with respect to content held within the trusted domain. For example, movie content held within a cable operator's trusted domain (e.g., on a hard drive of an STT) cannot be distributed over the Internet in viewable form and cannot become a source for duplication of multiple viewable copies.

A second layer may be defined as being outside the trusted domain. In accordance with the invention, a device in the second layer is assigned an indicator indicating an extent of security of the device. For example, when the device in the second layer requests transfer of protected content from a device in the first layer, the first layer device authenticates the second layer device to determine legitimacy of the device for receiving the protected content. After the second layer device is authenticated, the first layer device transfers not only the protected content, but also a set of rules associated with the protected content. At least some of the rules in the set are associated with the indicator and applicable to the second layer device with respect to use of the protected content.

The invention broadly encompasses the concept of the multi-layered rights arrangement including the trusted domain for preventing unauthorized use of protected content.

The invention is not limited to use of specific devices in the arrangement. For example, the invention equally applies to a host device connected to a CableCARD module, jointly realizing, e.g., the functionalities of a DVR STT. In an embodiment of the invention, the host device has programming content, which is encrypted, stored in storage therein. The module may receive a request from the device for accessing the programming content. The request includes a data package stored in association with the encrypted programming content in the storage. In response to the request, the module may determine that the device is allowed to access the programming content based on information (e.g., usage rights information) in the first data package. The module may then provide the host device at least data concerning a cryptographic element (e.g., an encryption key) for decrypting the encrypted programming content in the storage, thereby providing the device with access to the programming content.

In one aspect of the disclosure, a computer readable device is disclosed. In one embodiment, the computer readable device includes a storage medium and a hardware processor. In one implementation, the hardware processor may be configured to execute a plurality of instructions, which are configured to, when executed: (i) send to a module apparatus a request to record program content; (ii) receive from the module apparatus a response to the request to record; (iii) encrypt the program content with a second version of the cryptographic element derived from the data package; (iv) store the encrypted program content in association with the data package; (v) register one or more display devices with the device based at least in part on a verification of data in a digital certificate provided by the one or more display devices; (vi) receive a request to transfer the encrypted program content to the one or more display devices; (vii) determine, before the encrypted content is transferred to the one or more display devices, whether an extent of security of the one or more display devices meets a certain one of the plurality of rules; and (viii) based on the determination, transfer the encrypted program content to the one or more display devices.

In one variant, the response includes: (i) a data package comprising at least a version of a cryptographic element; (ii) a rights file configured to define one or more transfer rights configured to control a device's ability to provide the requested program content to other devices; and (iii) an indicator that the device associated to the request to record is allowed to record the requested program content based at least in part on a plurality of rules.

In another aspect of the disclosure, a method for use in a device connectable to a module apparatus is disclosed. In one embodiment, the device includes storage therein, and the method includes: (i) sending to the module apparatus a request to record a selected programming content; (ii) receiving from the module apparatus a response to the request; (iii) based at least in part on the indicator of the determination, recording the selected programming content; (iv) encrypting the recorded programming content with a second encryption key, the second encryption key being derived from the encrypted version of the first encryption key contained within the data package; (v) storing the encrypted programming content in association with the data package in the storage; (vi) authenticating one or more display devices registered with the device by verifying data in a digital certificate provided by individual ones of the one or more display devices; and (vii) based at least in part on the act of authenticating, making the encrypted programming content available to view on one or more display devices registered with the device.

In one variant, the response includes: (i) a data package containing at least an encrypted version of a first encryption key; and (ii) an indicator of a determination that the device is allowed to record the selected programming content, the determination based at least in part on a security measure associated with the selected programming content.

In yet another aspect of the disclosure, a device connectable to a module apparatus is disclosed. In one embodiment, the device includes: (i) a processor which generates a request to record selected programming content; (ii) an interface; (iii) an encryption apparatus which causes the processing unit to encrypt the recorded programming content with a second encryption key, the second encryption key being derived from the encrypted version of the first encryption key contained within the data package; (iv) storage which stores the encrypted programming content in association with the data package therein; and logic.

In one implementation, the interface includes: (i) transmitting the request to the module apparatus; and (ii) receiving, from the module apparatus, a response to the request. In one variant, the response includes: (i) a data package containing at least an encrypted version of a first encryption key, and (ii) a determination that the device is entitled to record the selected programming content based at least in part on at least one first security measure associated with the selected programming content, the selected programming content being recorded based on the determination. In another implementation, the logic causes the interface to: (i) authenticate the one or more second devices via verification of data in a digital certificate provided by individual ones of the one or more second devices; and (ii) transfer the recorded programming content to one or more second devices in communication therewith via at least one in band transmission channel of a hybrid fiber coaxial (HFC) network, only when it is determined that the first security measure meets a certain one of a plurality of rules.

These and other features and advantages of the present disclosure will immediately be recognized by persons of ordinary skill in the art with reference to the drawings and detailed description of exemplary embodiments as provided herein.

BRIEF DESCRIPTION OF THE DRAWINGS

Further objects, features and advantages of the invention will become apparent from the following detailed description taken in conjunction with the accompanying drawing showing illustrative embodiments of the invention, in which:

FIG. 2 illustrates a subscriber registry maintained in a headend of the system of FIG. 1;

FIG. 3 illustrates a device key table maintained in a headend of the system of FIG. 1;

FIG. 12 illustrates a rights file, in accordance with an embodiment of the invention;

FIG. 15 illustrates a content activity record, in accordance with an embodiment of the invention;

FIG. 19 illustrates a persistent security package (PSP) for inclusion in the reply, in accordance with the invention;

FIG. 20 illustrates a temporary security package (TSP) for inclusion in the reply, in accordance with the invention.

DETAILED DESCRIPTION

Figure 1:
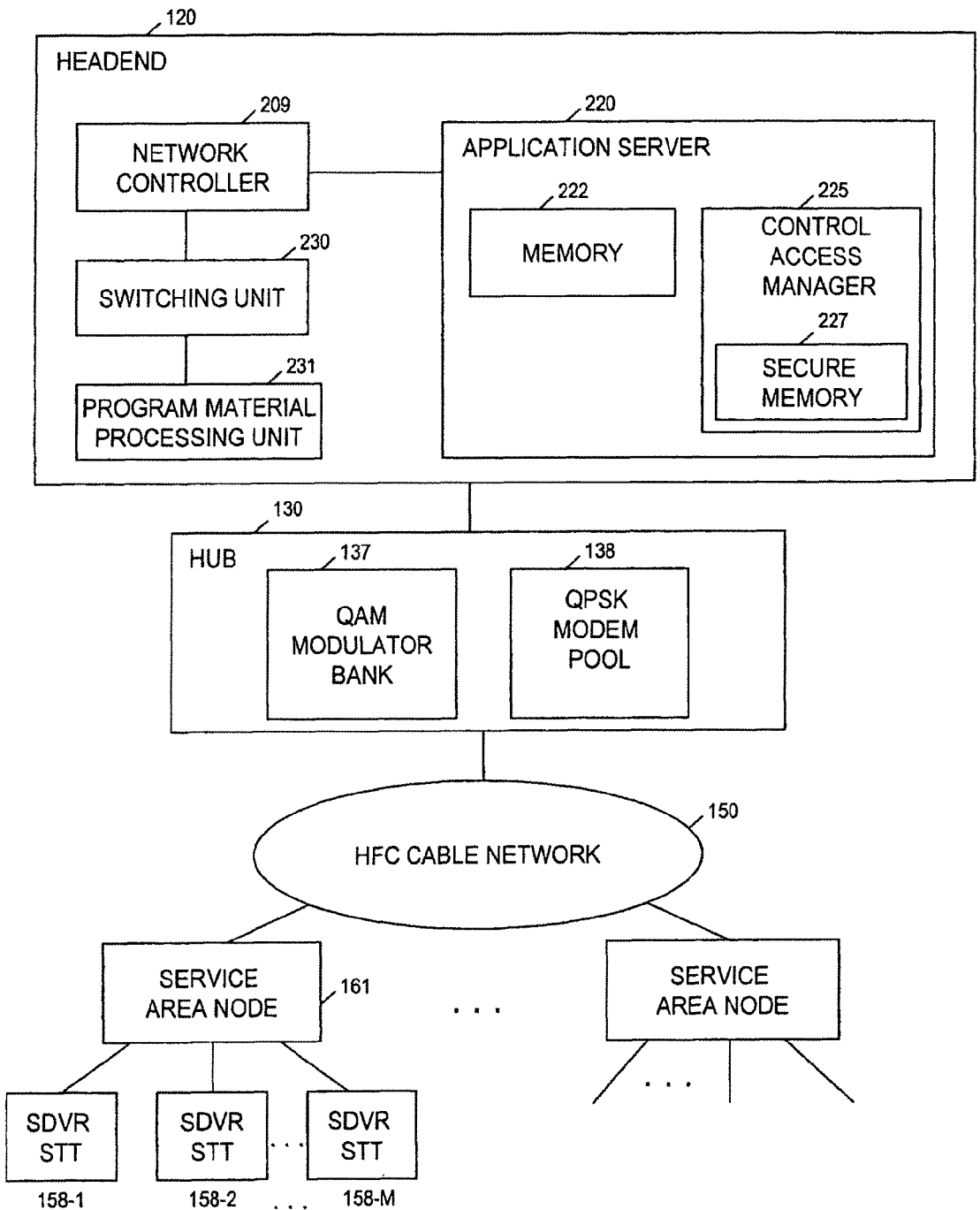
FIG. 1 illustrates components of a broadband communications system, in accordance with an embodiment of the invention.

The invention is directed to a technique for securely transferring protected programming content from one protective layer to another to prevent unauthorized access and copying of the protected content. One such protective layer is referred to as a "trusted domain." In a cable TV system, the trusted domain includes not only the system portion where programming content traditionally is secured by, and within total control of, a cable operator, including, e.g., the headend, delivery network, etc., but also user devices at subscribers' premises which are capable of receiving and storing programming content, e.g., a DVR STT, and which implement a conditional access mechanism described below. For the sake of convenience, a DVR STT which implements the conditional access mechanism hereinafter is referred to as a "secure DVR STT (SDVR STT)."

The cable operator can control certain subscriber access and usage with respect to content held within the trusted domain. For example, a motion picture held within a cable operator's trusted domain (e.g., on a hard drive of an SDVR STT) cannot be distributed over the Internet in viewable form and cannot become a source for duplication of multiple viewable copies. In accordance with the invention, a multi-layered rights arrangement is instituted to facilitate secure transfer of content from one protective layer (e.g., the trusted domain) to another (e.g., outside the trusted domain). In an illustrative embodiment, a first device within the trusted domain is allowed to transmit protected content to a second device outside the trusted domain, provided that the second device recognize and function pursuant to the multi-layered rights arrangement with respect to the protected content. In other words, although the second device outside the trusted domain may receive protected content from the first device in the trusted domain, use and distribution by the second device of the protected content are subject to the rights and restrictions specified by the multi-layered rights arrangement.

In accordance with the multi-layered rights arrangement, a receiving device may be assigned a security level indicative of the security of the device. In one embodiment, a receiving device may be assigned a security level 1 (low level of trust), 2 (medium level of trust), or 3 (high level of trust). A receiving device's security level determines the set of rights that are accorded to it with respect to the received content.

By way of example, suppose that a personal media device (PMD) outside the trusted domain requests a copy of a movie from an SDVR STT within the trusted domain. A PMD may be, e.g., a digital video player, personal computer (PC), personal digital assistant (PDA), mobile telephone, etc. If the PMD is a Security Level 1 device, it may not be authorized to receive the movie content. If the PMD is a Security Level 2 device, it may be authorized to receive the movie content, but its rights to play the movie, and to transfer the movie content to other devices, may be restricted. If the PMD is a Level 3 device, it may be authorized to receive the movie content, and additionally may have unlimited rights to play the movie and to transfer it to other devices (which in turn are bound by the respective rights specified by the multi-layered rights arrangement).

In implementing the multi-layered rights arrangement, a content file containing protected content, e.g., content of a movie, is associated with a "rights" file which may define the rights of a receiving device to use the protected content, and may also specify the minimum security level of the devices allowed to receive the protected content in the first place. In one embodiment, when a PMD outside the trusted domain requests an STT in the trusted domain to transfer protected movie content thereto, the STT authenticates the PMD and identifies its security level. The STT examines the rights file to determine if the PMD meets the minimum security level requirement. If it does, the STT transfers the movie content file along with the rights file to the PMD. The PMD then examines the received rights file to determine its own rights with respect to the movie content. For example, if the PMD is a Security Level 2 device, it will use the movie content pursuant to the set of rights in the rights file prescribed for Security Level 2 devices. In another embodiment, the STT transfers the content and rights files to the PMD as soon as the PMD is authenticated, without determining its security level or whether the PMD meets the minimum security level requirement. It is up to the PMD to observe autonomously the rights associated with its security level prescribed in the rights file, including whether it is allowed to receive and keep the protected content in the first place.

FIG. 1 illustrates components of a broadband communications system, e.g., a cable TV system, embodying the principles of the invention. Headend 120 receives programming content attributed to various program channels, and provides cable television services to STTs including, e.g., SDVR STTs 158-1 through 158-M, where M represents an integer. It should be noted that the same cable television services are also provided to prior art STTs with no programming content storage capability which, however, are not of interest here. It should also be noted that the terms "transmission channel" and "program channel" should not be confused. A "transmission channel" signifies a designated frequency band through which a transport stream containing programming content and/or data is transmitted. A "program channel" signifies the source of programming content or the service selected by a user to view. For example, a user may select program channel 2 to view programming content provided by CBS, program channel 14 to view programming content provided by ESPN, etc.

In a conventional manner, headend 120 delivers programming content downstream to SDVR STTs 158-1 through 158-M in a service area or neighborhood, where M represents an integer. As shown in FIG. 1, SDVR STTs 158 are connected to network 150 through a service area node 161. In this instance, network 150 is a multi-channel delivery network comprises a well-known hybrid fiber coaxial (HFC) cable network.

Programming content is delivered downstream from headend 120 to SDVR STTs 158 through "in-band" transmission channels. In one embodiment, these transmission channels may be 6 MHz bands populating a forward passband, e.g., 350-750 MHz band, of a coaxial cable. QAM modulator bank 137 in hub 130 modulates the transport streams containing the programming content onto selected in-band channels, in accordance with a QAM scheme.

In addition, downstream data, e.g., control messages, emergency information, etc., may be communicated from headend 120 to SDVR STTs 158 via one or more forward data channels (FDCs), sometimes referred to as "out-of-band" channels. The FDCs may occupy the 70-130 MHz band of a coaxial cable. QPSK modem pool 138 in hub 130 modulates downstream data onto selected FDCs, in accordance with a QPSK scheme.

Upstream data, e.g., application data, file requests, etc., may be transmitted from SDVR STTs 158 to headend 120 via one or more reverse data channels (RDCs), which occupy a reverse passband, e.g., 5-40 MHz band, of a coaxial cable. The data traversing the RDCs is modulated in accordance with a QPSK scheme. QPSK modem pool 138 in hub 130 receives the QPSK signals containing the data from the RDCs and performs any necessary demodulation before transmitting the underlying data to headend 120. Using a contention-based access mechanism established by the Digital Audio Visual Council (DAVIC), a standard setting organization, each STT can share an RDC with other STTs in the network. This mechanism enables an STT, e.g., SDVR STT 158-1, to transmit upstream messages without a dedicated connection to a QPSK demodulator. The mechanism also provides equal access to the STTs that share the RDC, and enables detection and recovery from reverse path collisions that occur when two or more of the STTs transmit an upstream message simultaneously. As also specified by DAVIC, for communications purposes, each STT and network controller 209 are identified by the Internet protocol (IP) addresses assigned thereto. However, these IP addresses may be randomly assigned each time the broadband communication system is reconfigured. As a result, the IP address of an STT or that of network controller 209 may change after a system reconfiguration. Nevertheless, each STT and network controller 209 are also assigned a media access control (MAC) address on a permanent basis, surviving any system reconfiguration.

Headend 120 includes, among others, program material processing unit 231, application server 220, network controller 209, and switching unit 230. In a well-known manner, program material processing unit 231 receives programming content from various sources attributed to different program channels, and generates transport streams containing the programming content, e.g., in accordance with a well known MPEG-2 scheme. Under control of network controller 209, the transport streams are switched by switching unit 230 to appropriate modulators in QAM modulator bank 137 in hub 130, where the transport streams are modulated onto the corresponding in-band transmission channels for delivery to STTs over network 150.

Application server 220 may include one or more server systems that provide software applications and services for STT users. For example, application server 220 may contain one or more software applications for providing database services, network management services, interactive program guide services, billing services, etc. Server 220 may maintain in memory 220 a subscriber registry, denoted 360 in FIG. 2. Registry 360 is illustrated in the form of a table, where column 363 includes, for each STT in the system, an identifier identifying the STT (STID). In this example, each STT is identified by its MAC address. For example, SDVR STT 158-1 may be identified by a MAC address denoted MAC-1. Column 364 includes a subscriber ID (e.g., subscriber's name, ID number, etc.) identifying a subscriber to the cable television services who is associated with each respective STT. For example, referring to row 368-1, STT 158-1 is associated with the subscriber identified by S-1. In this example, subscriber S-1 may be, for example, an individual who purchased or leased SDVR STT 158-1 and registered with the operator as the user thereof. It should be noted that a given subscriber may be associated with more than one STT. Referring to row 368-2, for example, SDVR STT 158-2 is also associated with subscriber S-1. In this example, subscriber S-1 may have purchased or leased STT 158-2 for use as a second STT in his or her home.

In this instance, application server 220 also incorporates access control manager 225 for realizing the trusted domain including therein the SDVR STTs at the subscribers' premises, which are subject to the aforementioned conditional access mechanism. To that end, manager 225 maintains access control related data pertaining to the SDVR STTs and/or subscribers. For example, manager 225 may maintain in memory 222 a library of device public keys associated with the SDVR STTs in the cable TV system. When an SDVR STT is provided to a subscriber, a "public key-private key pair" has been assigned to the SDVR STT in anticipation of data encryption in accordance with a public key algorithm. The "device private key" of the SDVR STT is stored in a secure memory therein while the "device public key" may be transmitted to manager 225 through an RDC during an initialization process of the SDVR STT. Alternatively, during registration of the SDVR STT, the subscriber may provide the cable operator with the serial number of the SDVR STT, if the cable operator has not already had it, for the cable operator to look up the public key associated with the SDVR STT. The library of device public keys is illustrated in the form of a table, denoted 273 in FIG. 3. Device key table 273 comprises column 276 which includes an STID of each SDVR STT in the system, which is its MAC address in this instance. For example, SDVR STT 158-1 is identified by address MAC-1 as mentioned before. Column 277 registers a device public key assigned to each respective STT. In this example, each device public key is 512 bits long. Referring to row 279-1, for example, STT 158-1 is assigned a public key denoted DPUB-KEY-1. It should be noted that table 273 is intended for illustrative purposes only. In other embodiments, different identifiers, e.g., IP addresses, may be used in table 273 to identify various STTs in the network.

Each subscriber associated with an SDVR STT is also assigned a public key-private key pair in anticipation of another data encryption in accordance with a public key algorithm. Manager 225 may maintain a subscriber key table, denoted 283 in FIG. 4. Subscriber key table 283 includes column 286 which enumerates an identifier of each subscriber associated with an SDVR STT, e.g., S-1, S-2, S-3, etc. Columns 287 and 288 contain, respectively, a "subscriber public key" and the "subscriber private key" counterpart assigned to each subscriber. Referring to row 289-1, for example, subscriber S-1 is assigned a subscriber public key denoted SPUBKEY-1 and subscriber private key denoted SPRIKEY-1. Such a key pair may be assigned to each subscriber by the cable operator during a service registration by the subscriber. Because the subscriber private keys need to be kept secret, table 283 may be maintained by manager 225 in secure memory 227.

Figure 5:
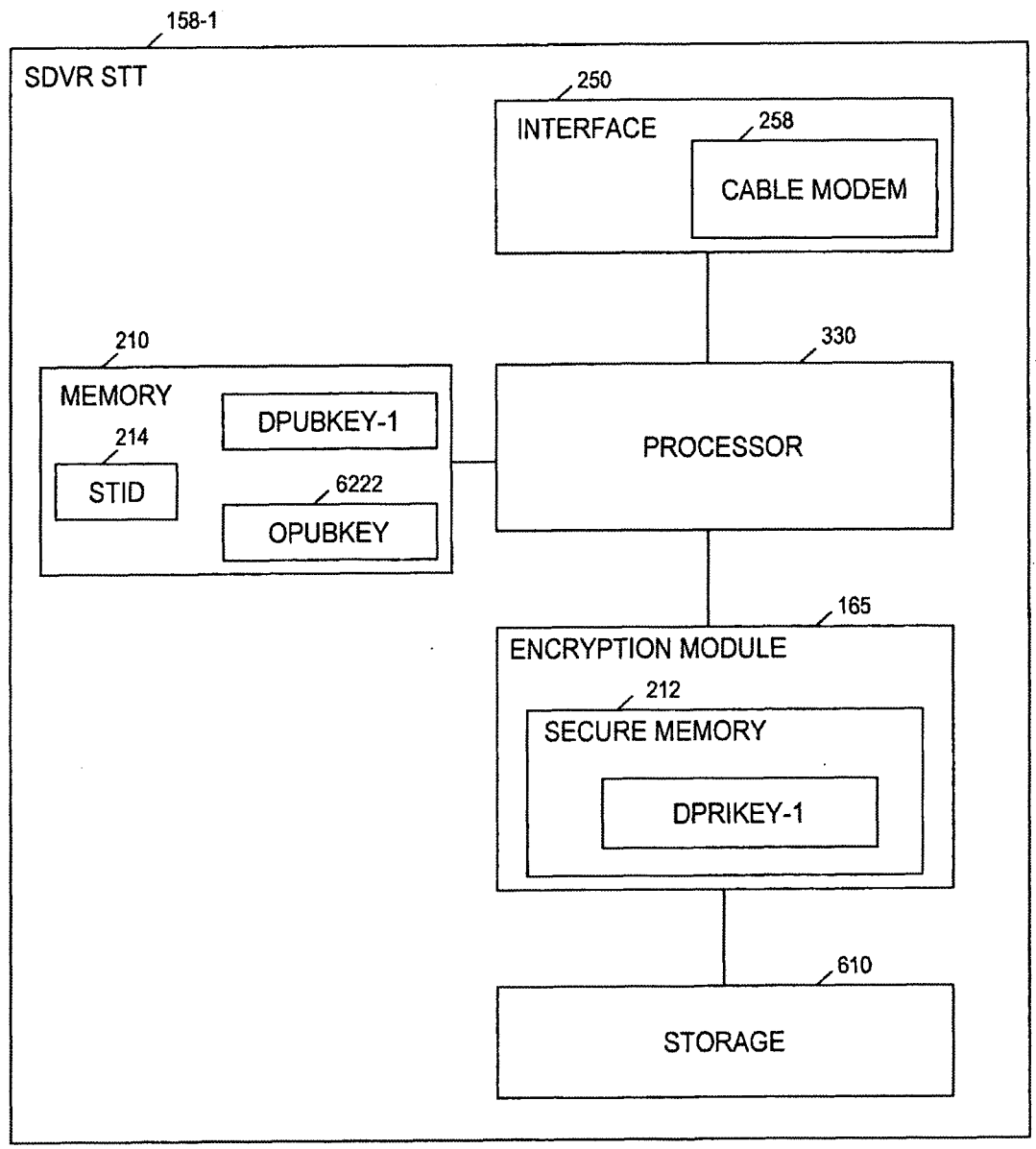
FIG. 5 illustrates components of a first secure digital video recorder (SDVR) STT, in accordance with an embodiment of the invention.

FIG. 5 illustrates components of a generic SDVR STT (e.g. 158-1) in accordance with the invention, which include, among others, processor 330, interface 250, memory 210, storage 610, and encryption module 165. Processor 330 orchestrates the operations of SDVR STT 158-1. Interface 250 includes cable modem 258 capable of demodulating signals containing programming content and data from in-band channels and FDCs, and modulating data signals onto RDCs. Interface 250 also performs other well-known formatting and reformatting functions necessary to transmit or receive programming content and data.

Memory 210 stores a variety of software applications and data including, e.g., an operating system (not shown) which provides the basic functionality for SDVR STT 158-1, and STID 214 for identifying SDVR STT 158-1, which is its MAC address MAC-1 in this instance. Memory 210 may be, e.g., a non-volatile random-access memory.

The aforementioned device private key assigned to STT 158-1, namely, DPRIKEY-1, is stored in secure memory 212 in encryption module 165 in such a manner that it cannot be discovered or tampered with easily and certainly not without notice. On the other hand, the device public key assigned to SDVR STT 158-1, namely, DPUBKEY-1, a copy of which is registered in table 273 in headend 120 as discussed before, is stored in memory 210, and which may be contained in a registration message (the "STT Registration Message"). Memory 210 also stores a public key associated with the cable operator, OPUBKEY 6222, for implementing the multi-layered rights arrangement in accordance with the invention.

Storage 610 is used for storing programming content, which in this instance may be a removable hard disk drive. It will be appreciated that storage 610 may comprise other forms of memory including, e.g., a digital video disk (DVD) drive, memory sticks, network-based storage, etc. Processor 330 may also perform such DVR functions as recording selected programming content in one or more media files, and storing them in storage 610. In this instance, a media file comprises a content file and a rights file associated therewith. The term "content file" here refers to a container that holds a distinct quantity of programming content. A content file may contain, e.g., a digitally recorded version of a movie such as "Citizen Kane." The rights file may be an Extensible Markup Language (XML) file, a binary file, a text file, etc., which may form part of a "header" of the media file. The rights file, fully described below, contains a specification of rights to use the associated programming content. The rights specification may be generated by the cable operator, in which case it is inserted by program material processing unit 231 into the program stream containing the associated programming content. Alternatively, the rights specification is generated by the source of the programming content, e.g., a TV broadcasting company, in which case the rights specification and the associated programming content are both contained in the program stream received by unit 231. In either case, the programming content is accompanied by the associated rights specification when it is provided to STT 158-1. Cable operators have observed that providing to subscribers an unrestricted right to save programming content often results in an unacceptable amount of unauthorized copying.

Accordingly, the aforementioned conditional access mechanism is implemented to create a trusted domain in which such unauthorized copying is precluded. In accordance with this mechanism, encryption module 165 generates a content key, e.g., a 3DES key for encrypting, in accordance with a 3DES algorithm, a media file provided by processor 330 before its storage. In this illustrative embodiment, a different content key is generated for encrypting each respective media file. However, it will be appreciated that a single content key may be used to encrypt all media files in the same storage. It will also be appreciated that multiple content keys may be used to encrypt a single media file.

Figures 4, 6:
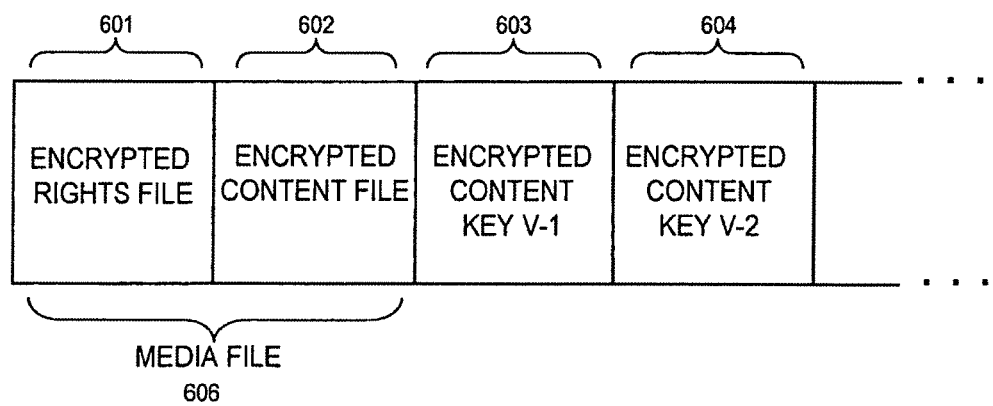
FIG. 4 illustrates a subscriber key table maintained in a headend of the system of FIG. 1.
FIG. 6 illustrates storage in the first SDVR STT.

In addition, module 165 encrypts each generated content key to form "encrypted content key version 1 (V-1)," and "encrypted content key version 2 (V-2)", and stores the encrypted content key versions (denoted 603 and 604 respectively in FIG. 6) in association with the corresponding encrypted media file 606 (i.e., encrypted using the content key) in storage 610. As shown in FIG. 6, media file 606 comprises encrypted content file 602 containing encrypted programming content, and encrypted rights file 601 containing a specification of rights, albeit encrypted, to use such programming content in file 602 by a device in another layer, e.g., outside the trusted domain, in accordance with the invention. In this illustrative embodiment, the encrypted content key V-1 is formed by encrypting the content key with the device public key assigned to SDVR STT 158-1 (i.e., DPUBKEY-1). On the other hand, the encrypted content key V-2 is formed by encrypting the content key with the subscriber public key assigned to subscriber S-1 (i.e., SPUBKEY-1) associated with SDVR STT 158-1 in this instance.

Figure 7:
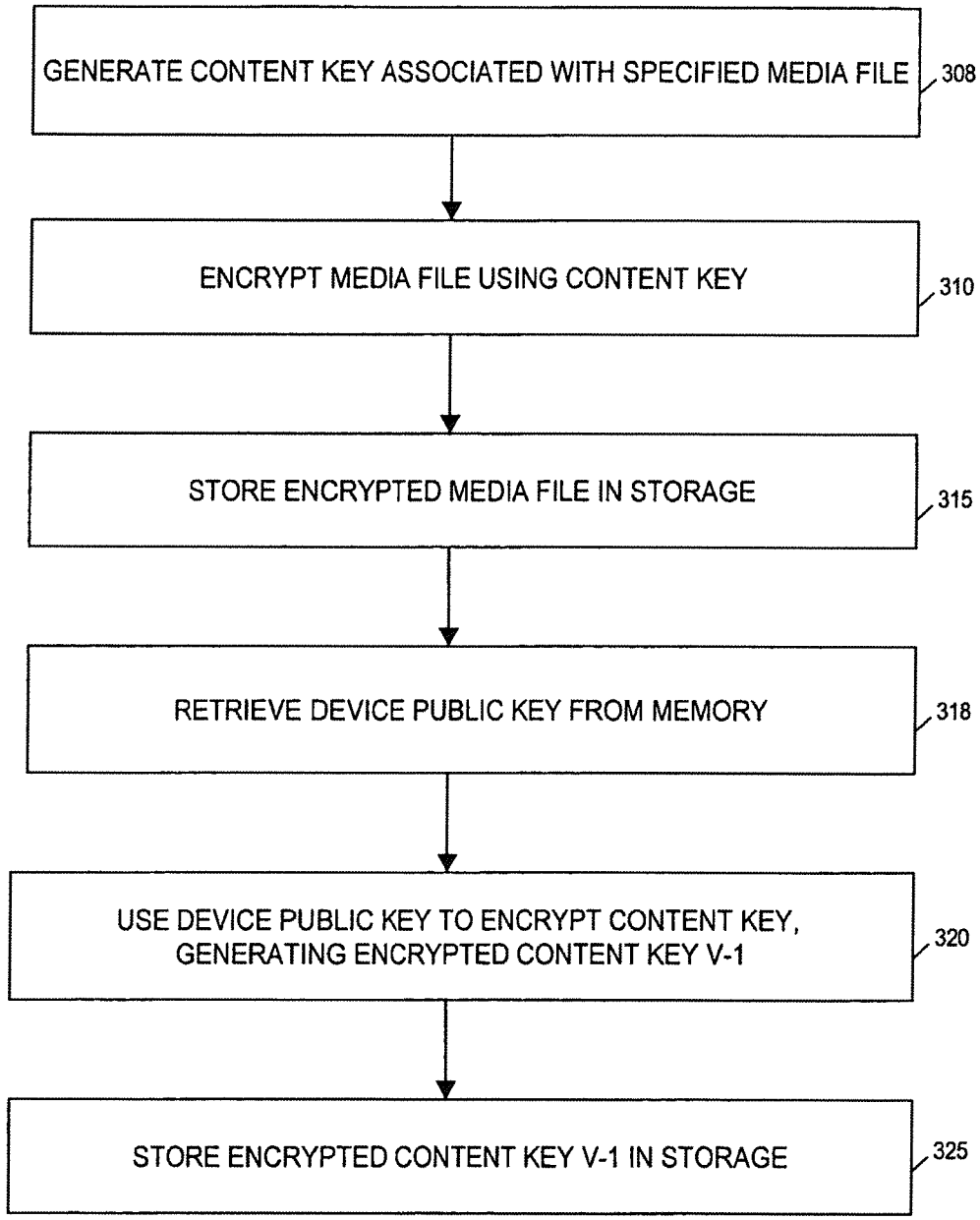
FIG. 7 is a flowchart depicting a routine for encrypting and storing a media file, in accordance with an embodiment of the invention.

By way of example, subscriber S-1 may direct SDVR STT 158-1 to record specified programming content, say, the "Citizen Kane" movie as it is broadcast over cable network 150. Accordingly, processor 330 generates a media file containing the specified movie content and the associated rights specification received from interface 250. FIG. 7 is a flowchart depicting a routine for encrypting and storing a media file. Instructed by such a routine, encryption module 165 at step 308 generates the aforementioned content key associated with the specified media file. At step 310, module 165 encrypts the media file using the content key, in accordance with the aforementioned 3DES algorithm. At step 315, module 165 stores the encrypted media file 606 in storage 610. At step 318, module 165 retrieves the device public key DPUBKEY-1 from memory 210. At step 320, module 165 uses DPUBKEY-1 to encrypt the content key in accordance with a first public key algorithm, e.g., an RSA algorithm. As mentioned above, the resulting encrypted content key is referred to as the "encrypted content key V-1." At step 325, module 165 stores the encrypted content key V-1, denoted 603, in storage 610. In one embodiment, the encrypted content key V-1 is stored in the form of metadata associated with the encrypted media file.

To generate the encrypted content key V-2, denoted 604, module 165 retrieves from storage 610 the encrypted content key V-1, from secure memory 212 device private key DPRIKEY-1, and from memory 210 STID 214 which is MAC-1 in this instance. Module 165 uses DPRIKEY-1 to decrypt the encrypted content key V-1, thereby recovering the content key in the clear. Module 165 then transmits the content key to headend 120 via an RDC in a secure manner. The secure transmission of a content key from STT 158-1 to headend 120 may be accomplished using a prior art encryption technique, e.g., a prior art public key encryption technique where a system private key is stored in headend 120, and the corresponding system public key is made public to, and stored in, all STTs including SDVR STT 158-1. In this instance, module 165 in SDVR STT 158-1 transmits, to control access manager 225 in application server 220, a message containing STID 214 and the content key encrypted using the system public key, in accordance with the prior art public key encryption technique.

Figure 8:
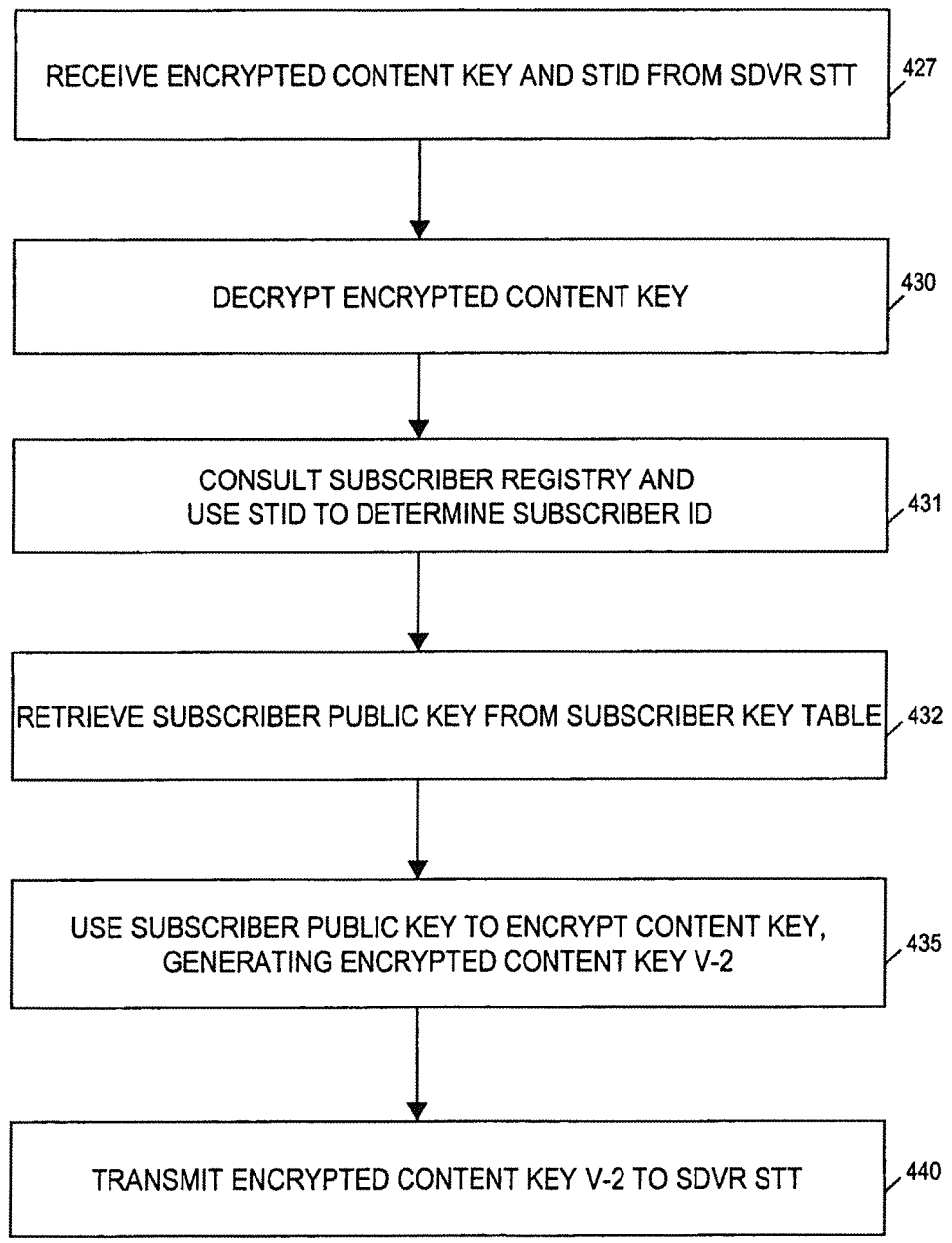
FIG. 8 is a flowchart depicting a routine for generating an encrypted content key associated with a subscriber, in accordance with an embodiment of the invention.

FIG. 8 is a flowchart depicting a routine for generating the encrypted content key V-2, in accordance with one embodiment. At step 427, manager 225 receives the encrypted content key and STID 214 in the message from SDVR STT 158-1, and at step 430 decrypts, using the aforementioned system private key, the encrypted content key to recover the content key in the clear. At step 431, manager 225 consults subscriber registry 360 and uses STID 214, which is MAC-1 in this instance, to determine the associated subscriber ID, which is S-1 in this instance. At step 432, manager 225 retrieves from subscriber key table 283 the subscriber public key, SPUBKEY-1 associated with S-1. At step 435, manager 225 uses the subscriber public key SPUBKEY-1 to encrypt the content key in accordance with a second public key algorithm, thereby generating the encrypted content key V-2. At step 440, manager 225 transmits the encrypted content key V-2 to SDVR STT 158-1 via an FDC.

After receiving the encrypted content key V-2 from manager 225, module 165 stores the encrypted content key V-2, denoted 604 in storage 610. In one embodiment, the encrypted content key V-2 is stored in the form of metadata associated with the encrypted media file 606. To decrypt the encrypted content file 602 for viewing the "Citizen Kane" movie content, module 165 may decrypt the associated encrypted content key V-1 (603) using DPRIKEY-1 in memory 212, thereby recovering the content key in the clear. Module 165 then applies the recovered content key to decrypt the encrypted content file 602.

Alternatively, STT 158-1 may be provided with the subscriber public key SPUBKEY-1. In a similar process used to create encrypted content key V-1, module 165 may use SPUBKEY-1 to generate encrypted content key V-2.

To show the portability of the encrypted media file 606 within the trusted domain, supposing that subscriber S-1 has purchased SDVR STT 158-2 for use as a second STT in his or her home, he or she may wish to transfer the media file to SDVR STT 158-2 and watch the program on a television set connected to SDVR STT 158-2. Alternatively, supposing that SDVR STT 158-1 is broken or is no longer functional for any reason, subscriber S-1 may wish to use SDVR STT 158-2 to view the stored programming content. To permit subscriber S-1 to copy the programming content for limited purposes such as these, the conditional access mechanism relies on encrypted content key V-2 (604), which is not associated with any particular device, to "migrate" programming content stored on a first device (e.g., STT 158-1) to a second device (e.g., STT 158-2) within the trusted domain. Specifically, in order for the second device to obtain the content key to decrypt the copy of the encrypted media file in STT 158-2, the latter needs an encrypted content key V-1 associated therewith. The content key V-1 associated with STT 158-2 can be successfully derived from the encrypted content key V-2

(604) provided that the subscriber associated with STT 158-2 be also S-1, which is the case here and reflected by subscriber registry 360 in FIG. 2. Referring to rows 368-1 and 368-2 of registry 360, in this instance both STT 158-1 having the MAC-1 address and STT 158-2 having the MAC-2 address are associated with S-1.

Figure 9:
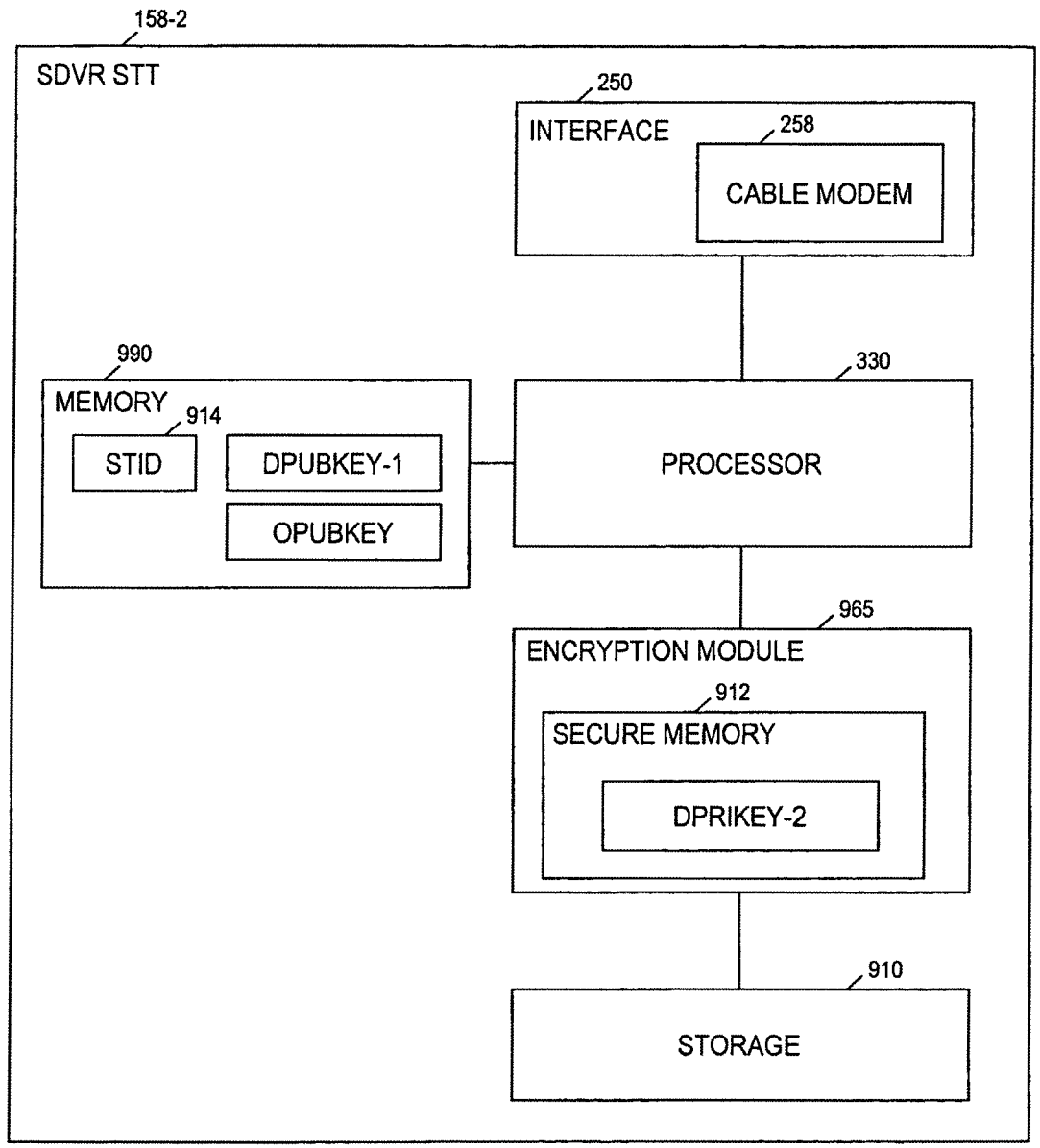
FIG. 9 illustrates components of a second SDVR STT, in accordance with an embodiment of the invention.

Assuming that SDVR STT 158-2 in FIG. 9 has in storage 910 a copy of the encrypted media file 606 (including encrypted content file 602), and an encrypted content key V-2 (604) from SDVR STT 158-1 (e.g., by physically removing storage 610 from SDVR STT 158-1 to SDVR STT 158-2, i.e., storage 610 the same as storage 910), encryption module 965 of STT 158-2 retrieves the encrypted content key V-2 (604) from storage 910, and STID 914 from memory 990. Module 965 transmits a message containing the encrypted content key V-2 (604) and STID 914 to headend 120.

Figure 10:
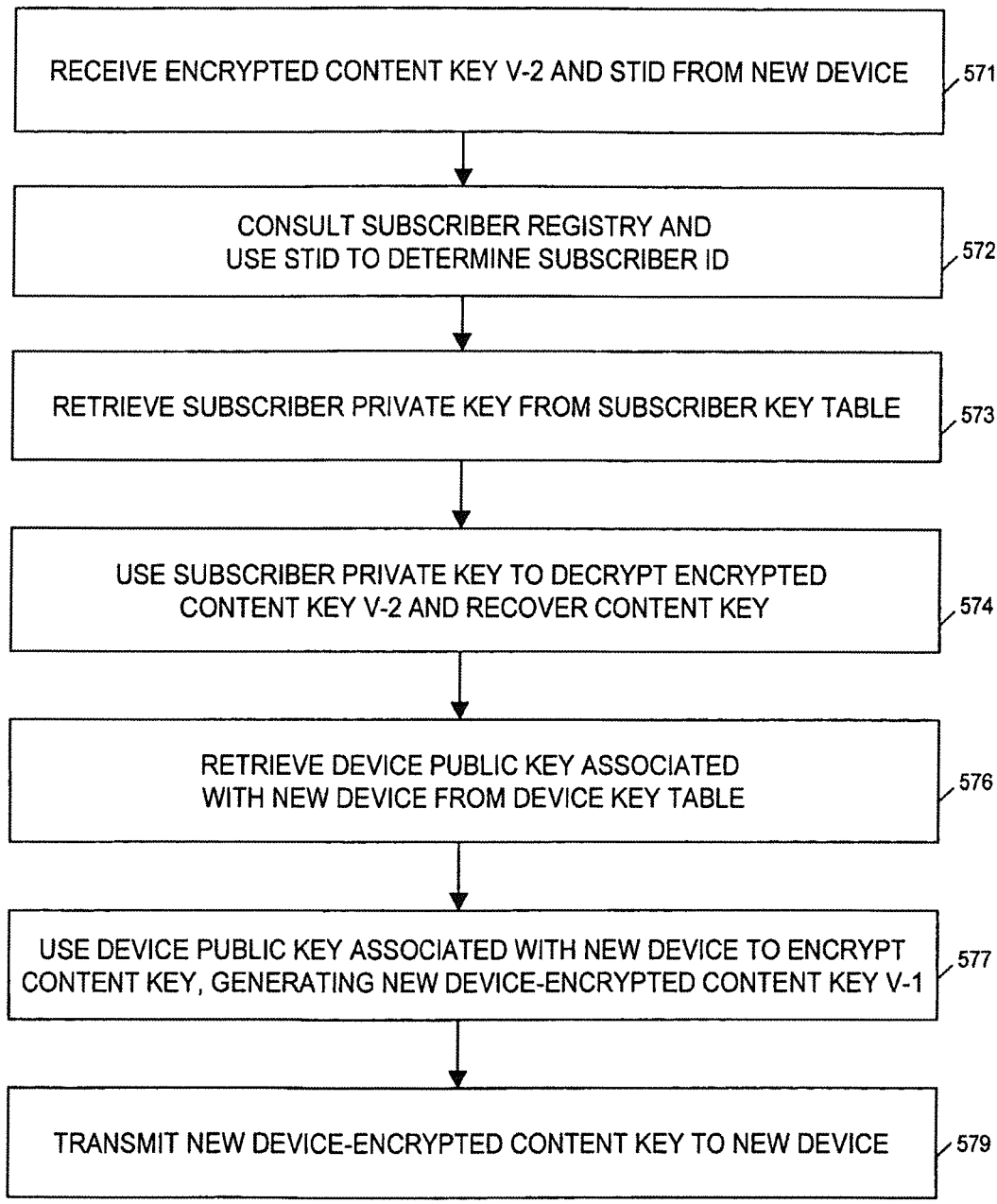
FIG. 10 is a flowchart depicting a routine for generating an encrypted content key associated with the second SDVR STT, in accordance with an embodiment of the invention.

At headend 120, the encrypted content key V-2 (604) is utilized to generate an encrypted content key V-1 associated with the SDVR STT 158-2, which is needed for STT 158-2 to derive the content key for decrypting the encrypted media file 606 including content file 602. FIG. 10 is a flowchart depicting a routine for generating an encrypted content key V-1 associated with STT 158-2, in accordance with an embodiment of the invention. At step 571, manager 225 in headend 120 receives from the new device STT 158-2 the encrypted content key V-2 (604) and STID 914. At step 572, manager 225 consults subscriber registry 360, and uses STID 914 (i.e., MAC-2) to determine the corresponding subscriber ID (i.e., S-1). At step 573, manager 225 retrieves from subscriber key table 283 the subscriber private key SPRIKEY-1 associated with subscriber S-1. At step 574, manager 225 uses the subscriber private key to decrypt the encrypted content key V-2 (604) and thereby recover the content key in the clear.

At step 576, manager 225 consults device key table 273 and retrieves the device public key DPUBKEY-2 associated with STID 914 which is MAC-2 in this instance. At step 577, manager 225 uses the device public key DPUBKEY-2 associated with STT 158-2 to encrypt the content key. The resulting encrypted version of the content key is referred to as the "new-device (ND) encrypted content key version 1 (V-1)." At step 579, manager 225 transmits the ND encrypted content key V-1 to STT 158-2 through an FDC.

Module 965 in SDVR STT 158-2 receives the ND encrypted content key V-1 from headend 120. Module 965 stores the ND content key V-1 in storage 910. At a subsequent point in time, module 965 may retrieve device private key DPRIKEY-2 from memory 912, and use it to decrypt the ND encrypted content key V-1 and recover the content key. Module 965 may then utilize the content key to decrypt the encrypted media file 606 and, in particular, encrypted content file 602 for viewing the "Citizen Kane" movie content.

In order for a device outside the trusted domain (e.g., a PMD) to receive protected content from another device in the trusted domain (e.g., an SDVR STT), both devices need to be provisioned to comport with the multi-layered rights arrangement in accordance with the invention. For example, under the multi-layered rights arrangement, each such PMD is assigned a security level indicative of the security of the device. A PMD may be assigned a security level of "1" (low level of trust), in which case the PMD is referred to as a "Security Level 1" device. Similarly, a "Security Level 2" device is associated with a medium level of trust, and a "Security Level 3" device is associated with a high level of trust. A device's security level determines the set of rights that are accorded to it with respect to a given protected content.

The security level assigned to a particular device may be determined, for example, by agreement between the cable operator and the manufacturer of the device, and represents the level of trust which the cable operator accords the respective device. Thus, a cable operator may assign, e.g., a Security Level 3 to a device which utilizes advanced encryption techniques when receiving and transmitting content, and which maintains content files in a secure memory. On the other hand, a cable operator may assign a Security Level 1 to a high-definition television set which does not ordinarily use encryption methods when receiving or transmitting content.

By way of example, suppose that a user wishes to transfer a copy of the movie "Citizen Kane" from STT 158-1 in the trusted domain to a PMD which is outside the trusted domain. In this example, if the PMD is a Security Level 1 device, it is not authorized to receive the movie content. If the PMD is a Security Level 2 device, it is authorized to receive the movie content, but its right to play the movie, and its right to transfer the movie to other devices, are restricted. If the PMD is a Level 3 device, it is authorized to receive the movie content, and additionally has unlimited rights to play the movie and to transfer it to other devices (subject to the rights of the other devices' associated with their respective security levels).

Figure 11:
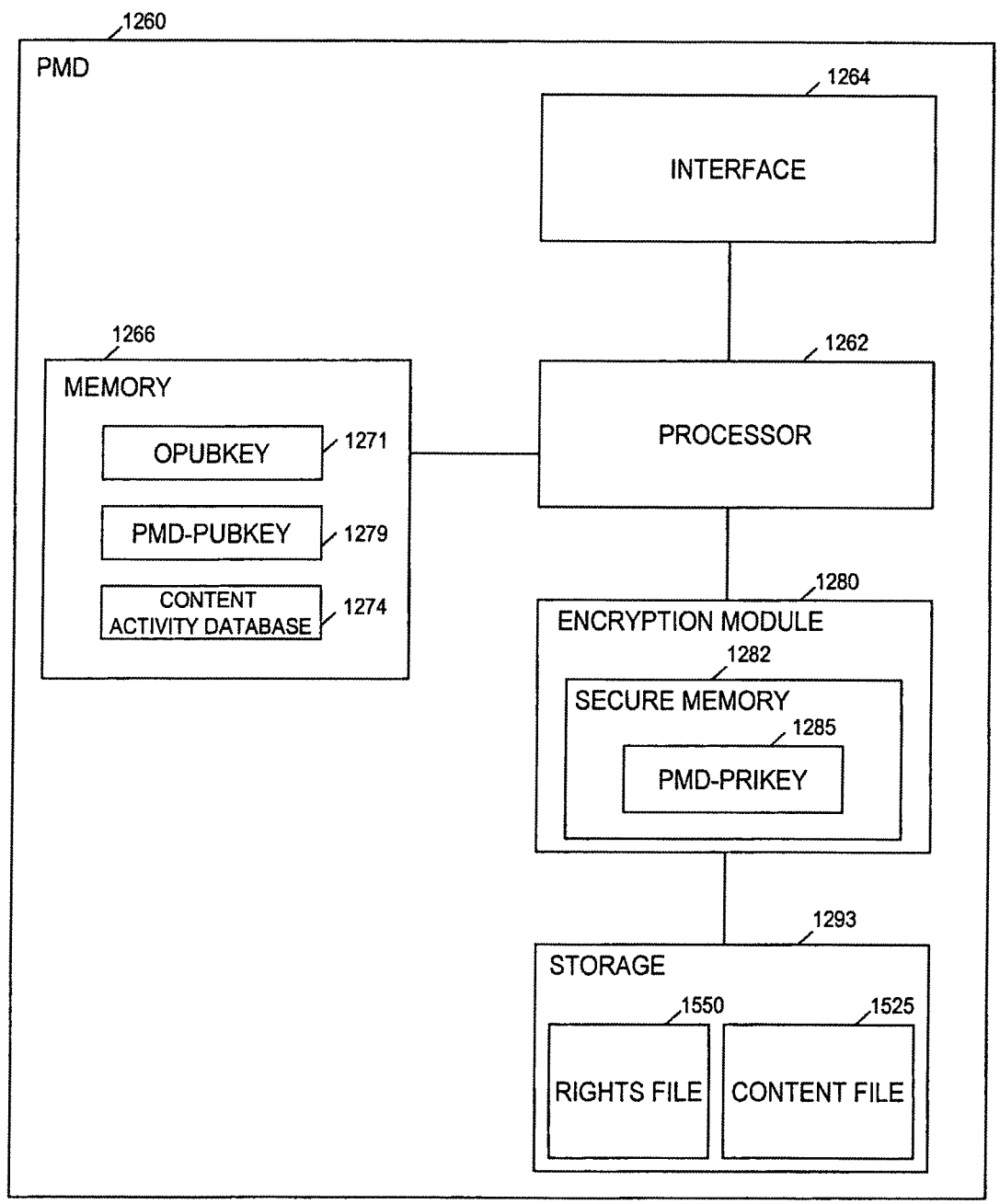
FIG. 11 illustrates components of a personal media device (PMD), in accordance with an embodiment of the invention.

FIG. 11 illustrates components of a PMD denoted 1260. PMD 1260 is capable of receiving data from another media device, e.g., SDVR STT 158-1, and operates according to the multi-layered rights arrangement. PMD 1260 comprises processor 1262, interface 1264, memory 1266 and encryption module 1280. A copy of the cable operator's public key, OPUBKEY 1271, and the PMD's own public key, PMD-PUBKEY 1279, are stored in memory 1266. In this instance, PMD-PUBKEY 1279 is contained in a registration message (the "PMD Registration Message") which also contains, among others, data concerning the security level of PMD 1260. The private key counterpart to PMD-PUBKEY 1279, namely, PMD-PRIKEY 1285, is stored in secure memory 1282. PMD 1260 also includes storage 1293 which may be, e.g., a hard disk drive.

Suppose that a user at PMD 1260 requests to transfer thereto a copy of the movie "Citizen Kane" from SDVR STT 158-1. In response, SDVR STT 158-1 and PMD 1260 perform an authentication procedure using their respective registration messages. STT 158-1 and PMD 1260 maintain the STT Registration Message and PMD Registration Message containing not only their respective public keys, but also digital signatures to be verified. One device (STT 158-1 or PMD 1260) sends its registration message in a communication to the other device (PMD 1260 or STT 158-1), and the device receiving the communication decrypts the digital signature contained in the registration message using the cable operator's public key, to verify the sending device's identity and authority. The receiving device also obtains the public key of the sending device from the registration message. There may be two or more registration messages enclosed with the communication, forming a hierarchical message chain, where one registration message testifies to the authenticity of the previous message. At the end of a licensing hierarchy is a top-level licensing authority (e.g., the cable operator), which is trusted without a registration message from any other licensing authority.

When PMD 1260 submits to SDVR STT 158-1 a request for the movie "Citizen Kane," processor 330 in SDVR STT 158-1 requests that PMD 1260 authenticate itself. In response, processor 1262 in PMD 1260 transmits the PMD Registration Message containing PMD-PUBKEY 1279 to SDVR STT 158-3. Processor 330 in SDVR STT 158-1 retrieves OPUBKEY 6222 from memory 210, uses it to decrypt the PMD Registration Message, thereby authenticating the message through the licensing hierarchy. SDVR STT 158-1 additionally obtains PMD-PUBKEY 1279 from the PMD Registration Message.

After authenticating PMD 1260 through the licensing hierarchy, processor 330 in SDVR STT 158-1 transmits the STT Registration Message containing its own public key, DPUBKEY-1, to PMD 1260. Processor 1262 in PMD 1260 retrieves OPUBKEY 1271 from memory 1266 and uses it to decrypt the digital signature contained within the STT Registration Message, thereby authenticating it through the licensing hierarchy and obtaining DPUBKEY-1.

In accordance with an alternative embodiment, the PMD Registration Message contains a unique device identifier (the "PMD Device ID") as well as PMD-PUBKEY 1279 and data concerning the security level of PMD 1260. In this embodiment, when SDVR STT 158-1 receives the PMD Registration Message, SDVR STT 158-1 transmits the message to network controller 209 in headend 120. Controller 209 consults a stored table which includes a list of valid device identifiers, and the public key of each associated device. Controller 209 confirms whether the PMD Device ID and PMD PUBKEY 1279 contained in the registration message are valid, and reports the status of PMD 1260 to SDVR STT 158-1. Assuming PMD 1260 is determined to be an authorized device, processor 330 in SDVR STT 158-1 transmits the STT Registration Message containing its own public key, DPUBKEY-1, to PMD 1260.

In addition to the PMD's public key, SDVR STT 158-1 obtains data concerning the security level of PMD 1260 from the PMD Registration Message. In this example, let's suppose that SDVR STT 158-1 determines from the PMD Registration Message that PMD 1260 is a Security Level 2 device. Processor 330 causes encryption module 165 to decrypt encrypted media file 606 in storage 610 in the manner described above, yielding a content file containing the requested movie content and the associated rights file in the clear. However, before any content and rights files are transmitted to PMD 1260, these files are again encrypted using a random session key generated in SDVR STT 158-1, resulting in "session-encrypted" content and rights files. Encryption module 165 additionally encrypts the session key using the PMD-PUBKEY 1279. SDVR STT 158-1 transmits the encrypted Session Key to PMD 1260, along with the session-encrypted content and rights files. Processor 1262 in PMD 1260 retrieves PMD-PRIKEY 1285 from secure memory 1282, and uses it to decrypt the received, encrypted session key. Encryption module 1280 uses the recovered session key to decrypt the received session-encrypted content and rights files, resulting in content file 1525 and rights file 1550 in storage 1293, which are in the clear. Thus, in this instance, content file 1525 contains a digital version of the requested movie "Citizen Kane." Rights file 1550 defines one or more sets of rights accorded to various devices with respect to content file 1525. FIG. 12 illustrates rights file 1550, which comprises multiple data fields. Fields 5100-5120 contain descriptive information about the associated content. For example, Content Type field 5100 indicates the type of the associated content (movie); Title field 5110 contains the title of the movie (Citizen Kane); Actors field 5120 contains the names of actors in the movie, etc.

Data in field 5190 defines the transfer rights accorded to an STT, e.g., SDVR STT 158-1. In this example, field 5190 contains "2, 3" indicating that an STT is authorized to transfer the content to Security Level 2 devices and to Security Level 3 devices.

Data in fields 5210-5430 define three distinct sets of rights associated with the associated content, i.e., content file 1525: a first set of rights for Security Level 1 devices, a second set of rights for Security Level 2 devices, and a third set of rights for Security Level 3 devices. In this example, a Security Level 1 device obtains no rights with respect to the associated; thus, a Security Level 1 device cannot transfer the content to another device (field 5210), and cannot play the content for any length of time (field 5220). The number of times a Security Level 1 device is allowed to transfer the content to other devices is zero (field 5230).

Fields 5310-5330 define the set of rights accorded to a Security Level 2 Device. Field 5310 specifies those devices to which a Security Level 2 device is allowed to transfer the associated content. In this instance, field 5310 contains values "2, 3," indicating that a Security Level 2 device may transfer the associated content to a Security Level 2 device or to a Security Level 3 device. Play Time field 5320 indicates a duration during which a Security Level 2 device may play the associated content. This duration starts running when PMD 1260 receives a copy of content file 1525. In this instance, a Security Level 2 device can play the content for a seventy-two hour period after the content is received. According to field 5330, a Security Level 2 device is allowed to transfer the associated content to other devices up to three times.

Fields 5410-5430 define the rights accorded to a Security Level 3 device. A Security Level 3 device is authorized to transfer the content to a Security Level 3 device but not to Security Level 1 devices or to Security Level 2 devices (field 5410). There is no time limit regarding how long a Security Level 3 device can play the content (field 5420). According to field 5430, a Security Level 3 device may transfer the content an unlimited number of times to other devices.

Figure 13:
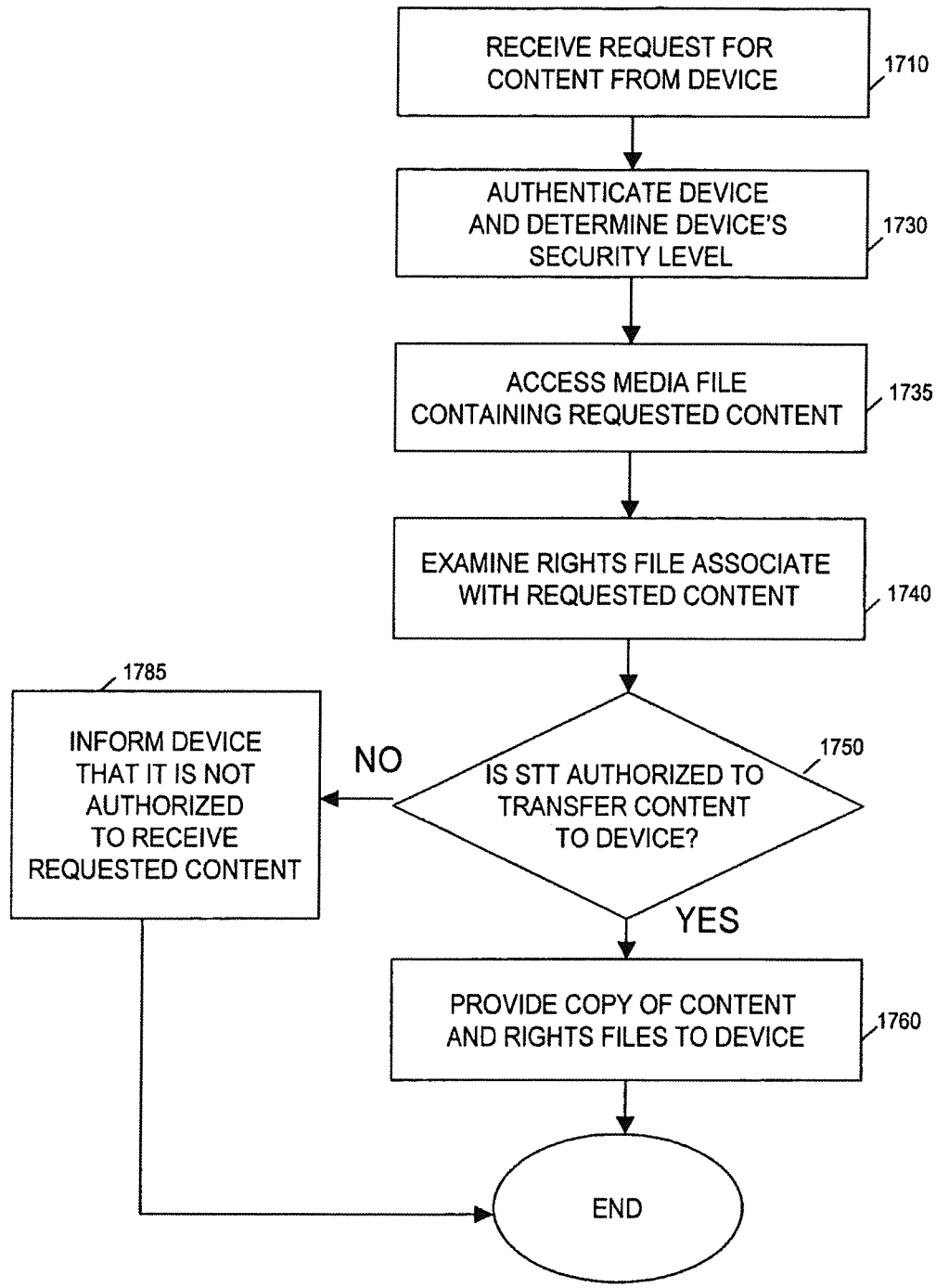
FIG. 13 is a flowchart depicting a routine for transferring content from an STT to another device, in accordance with a first embodiment of the invention.

FIG. 13 is a flowchart depicting a routine by an STT, e.g., SDVR STT 158-1, in the trusted domain to transfer content to another device, e.g., PMD 1260, outside the trusted domain, in accordance with a first embodiment of the invention. After receiving the request for the movie "Citizen Kane" from PMD 1260 (step 1710), SDVR STT 158-1 authenticates PMD 1260 and determines the device's security level (step 1730), in the manner described above. At step 1735, SDVR STT 158-1 accesses media file 606 which contains the requested content.

At step 1740, SDVR STT 158-1 examines the rights file associated with the requested content, after it decrypts file 601 with the content key in the manner described above, to determine whether SDVR STT 158-1 itself is authorized to transfer the movie content in file 602 to PMD 1260. Referring to field 5190 of FIG. 12, an STT is authorized to transfer the movie content to any Security Level 2 device or Security Level 3 device. Because PMD 1260 is a Security Level 2 device in this instance, SDVR STT 158-1 may transfer the content to PMD 1260. Thus, referring to block 1750, the routine proceeds to step 1760 where SDVR STT 158-1 provides a copy of the content file and the associated rights file to PMD 1260 (which may involve encrypting the content and rights file with a session key as described before). Again referring to block 1750, if PMD 1260 does not have a sufficiently high security level, the content cannot be transferred. In such case, PMD 1260 is informed that it is not authorized to receive the desired content (step 1785), and the routine comes to an end.

Figure 14:
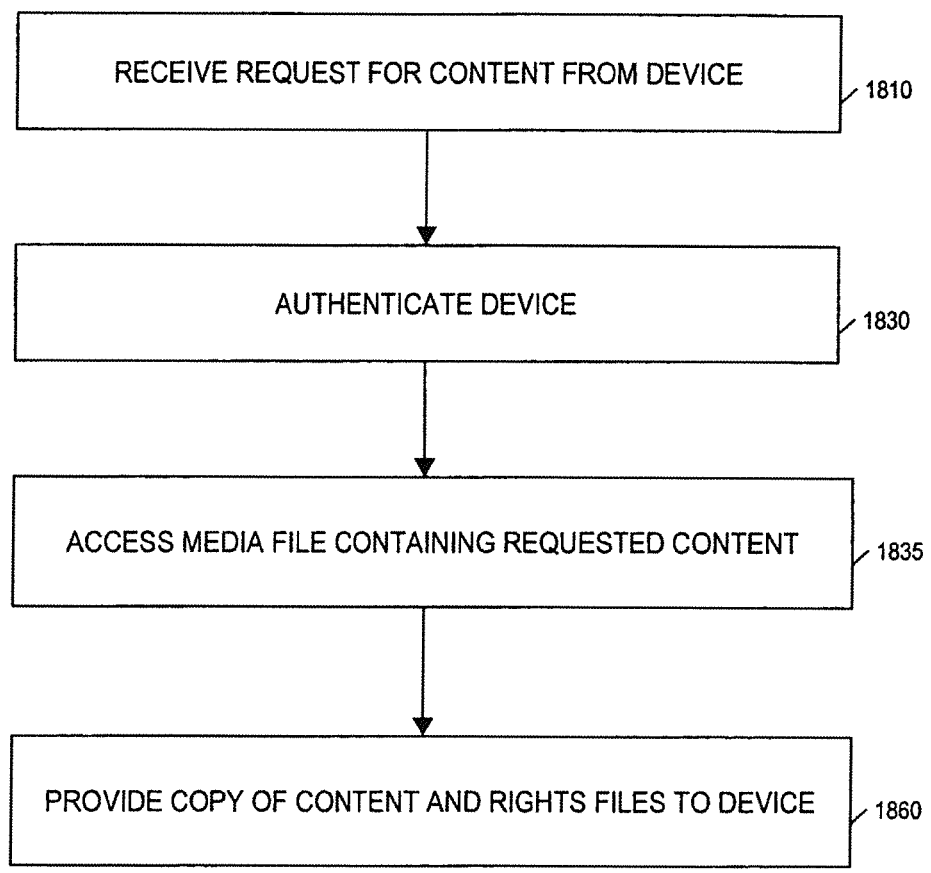
FIG. 14 is a flowchart depicting a routine for transferring content from an STT to another device, in accordance with a second embodiment of the invention.

FIG. 14 is a flowchart depicting a routine by an STT, e.g., SDVR STT 158-1, in the trusted domain to transfer content to another device, e.g., PMD 1260, outside the trusted domain, in accordance with a second embodiment of the invention. After receiving the request for content from the device at step 1810, SDVR STT 158-1 authenticates the requesting device at step 1830. At step 1835, SDVR STT 158-1 accesses media file 606, which contains the requested content. At step 1860, STT 158-1 provides a copy of the content file containing the requested content and associated rights file to PMD 1260, resulting in content file 1525 and rights file 1550 in storage 1293. In this second embodiment, full responsibility for operating in accordance with the appropriate set of rights in rights file 1550 is delegated to the requesting device, i.e., PMD 1260. Even if, for example, a Security Level 1 device (say, a HDTV television) requests the movie "Citizen Kane" from SDVR STT 158-1, in this second embodiment SDVR STT 158-1 provides a copy of the content and rights files automatically, without determining whether the HDTV television meets the minimum security level requirement (which is 2 in this instance). The HDTV television subsequently examines its copy of rights file 1550 and determines that it does not have the right to keep, play, or transfer the movie content, and acts accordingly.

To ensure that its activities concerning content file 1525 conform to the rights set forth in rights file 1550, PMD 1260 maintains content activity database 1274 in memory 1266. After receiving and storing files 1525 and 1550, PMD 1260 creates in content activity database 1274 a content activity record such as that shown in FIG. 15, based on the data in rights file 1550. Referring to FIG. 15, record 1720 comprises fields 1730-1732 which contain the type of content, the title of the movie, and the names of actors in the movie, respectively. Because PMD 1260 is a Security Level 2 device in this instance, processor 1262 extracts from rights file 1550 to content activity record 1720 the information pertaining to a Security Level 2 device. Thus, for example, field 1756 of content activity record 1720 indicates that PMD 1260 may transfer content file 1525 to a Security Level 2 device or to a Security Level 3 device. Field 1758 indicates that PMD 1260 may play content file 1525 for a duration of seventy-two hours. Field 1759 indicates that PMD 1260 may transfer content file 1525 to other devices up to three times.

Processor 1262 additionally records, in field 1772, the date and time when the content was received, i.e., when the content file 1525 was received in storage 1293. Processor 1262 additionally calculates an END TIME LIMIT value representing the end of the time limit specified in field 1773, by adding the PLAY TIME value in field 1758 to the DATE/TIME RECEIVED value in field 1772. The result is recorded in field 1773, and is used subsequently to ensure that content file 1525 is not played beyond the time limit accorded in rights file 1550. Processor 1262 also initializes a TRANSFER COUNT value by entering a zero value in field 1776; this value is subsequently increased by one each time PMD 1260 transfers content file 1525 to another device.

Figure 16:
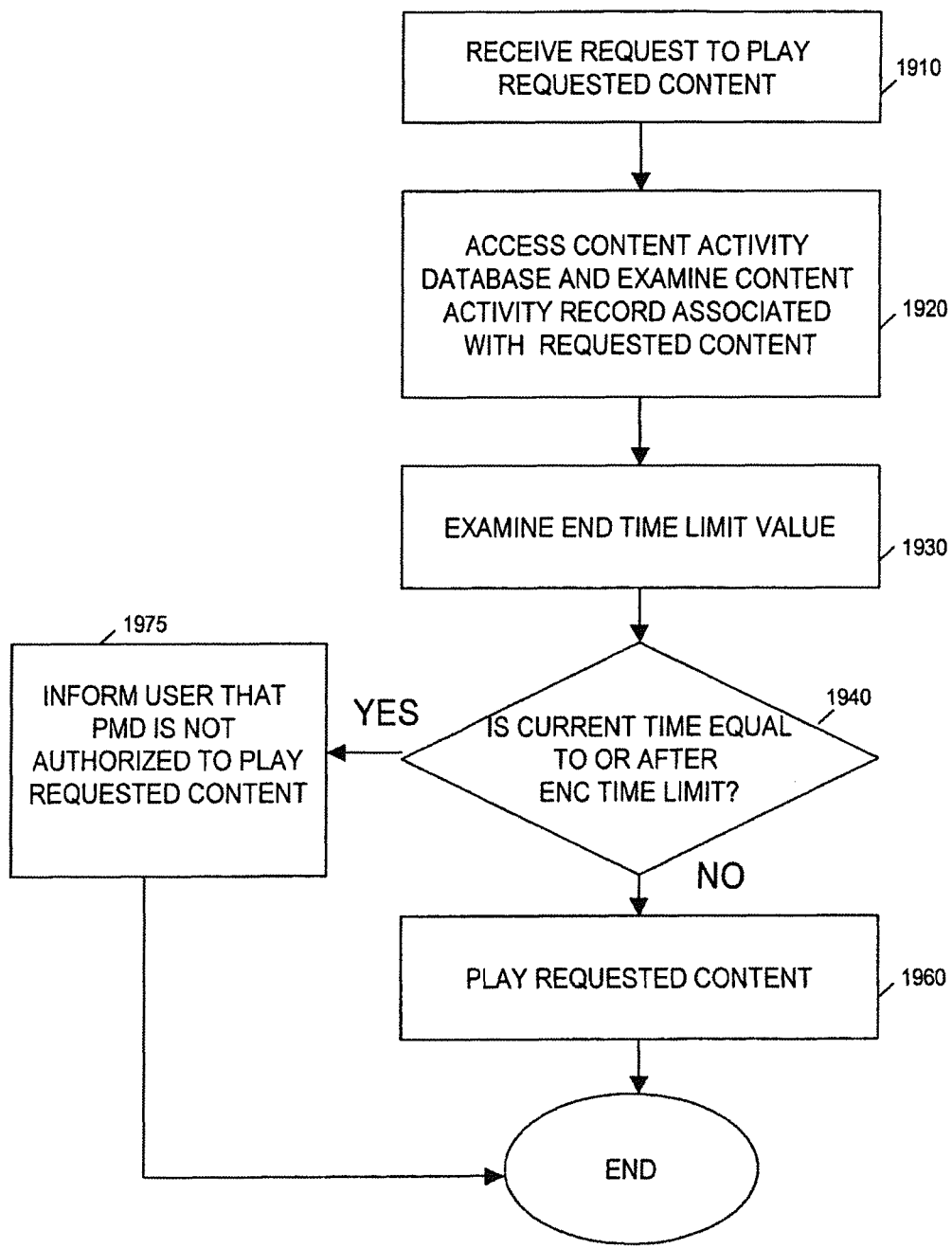
FIG. 16 is a flowchart depicting a routine for playing selected content, subject to the rights specified in the rights file of FIG. 12.

Thus, PMD 1260 uses content activity record 1720 to regulate its activities pertaining to content file 1525. At the same time, each time PMD 1260 performs an action pertaining to content file 1525, processor 1262 updates record 1720. By way of example, suppose that after receiving content file 1525, a user directs PMD 1260 to play the movie "Citizen Kane." Referring to FIG. 16, after receiving the request to play the desired content (step 1910), processor 1262 accesses content activity database 1274 and examines content activity record 1720 (step 1920). At step 1930, processor 1262 examines the END TIME LIMIT value in field 1773. Referring to block 1940, if the current time is equal to or after the END TIME LIMIT value, processor 1262 proceeds to step 1975 and informs the user that PMD 1260 is not authorized to play the requested content because the relevant time limit has expired. If the current time is before the END TIME LIMIT value, processor 1262 accesses content file 1525 and, at step 1950, causes the movie "Citizen Kane" to be played.

Suppose the user wishes to transfer a copy the movie "Citizen Kane" to another device, say, a personal computer (PC). In this case, after authenticating the PC and determines its security level, processor 1262 in PMD 1260 accesses content activity record 1720, examines the TRANSFER RIGHTS value in field 1756, and verifies that the PC is authorized to receive the movie content. Processor 1262 then compares the TRANSFER COUNT value in field 1776 to the # TRANSFERS LIMIT specified in field 1759. If the TRANSFER COUNT is less than the # TRANSFERS LIMIT, PMD 1260 transfers content file 1525, together with rights file 1550, to the PC, and increases by one the TRANSFER COUNT value in field 1776. The PC in turn observes its rights to use content file 1525 as specified in rights file 1550. Otherwise, if the TRANSFER COUNT value has reached is equal to) the # TRANSFERS LIMIT, processor 1262 informs the user that PMD 1260 is not authorized to transfer the content.

CableCARD and Host STT DVR Embodiment of the Invention

The invention broadly encompasses the concept of the multi-layered rights arrangement including the trusted domain for preventing unauthorized use of protected content, as fully described above. The invention certainly is not limited to specific devices (e.g., SDVR STT, PMD, etc.) used in the arrangement. In fact, an embodiment where a host STT DVR device connected with a CableCARD replacing the above-described SDVR STT (e.g., 158-1) in the inventive arrangement to perform similar functions will now be described. In this embodiment, the functionalities of the above-described SDVR STT simply are partitioned across the host STT DVR device and the CableCARD.

Figure 17:
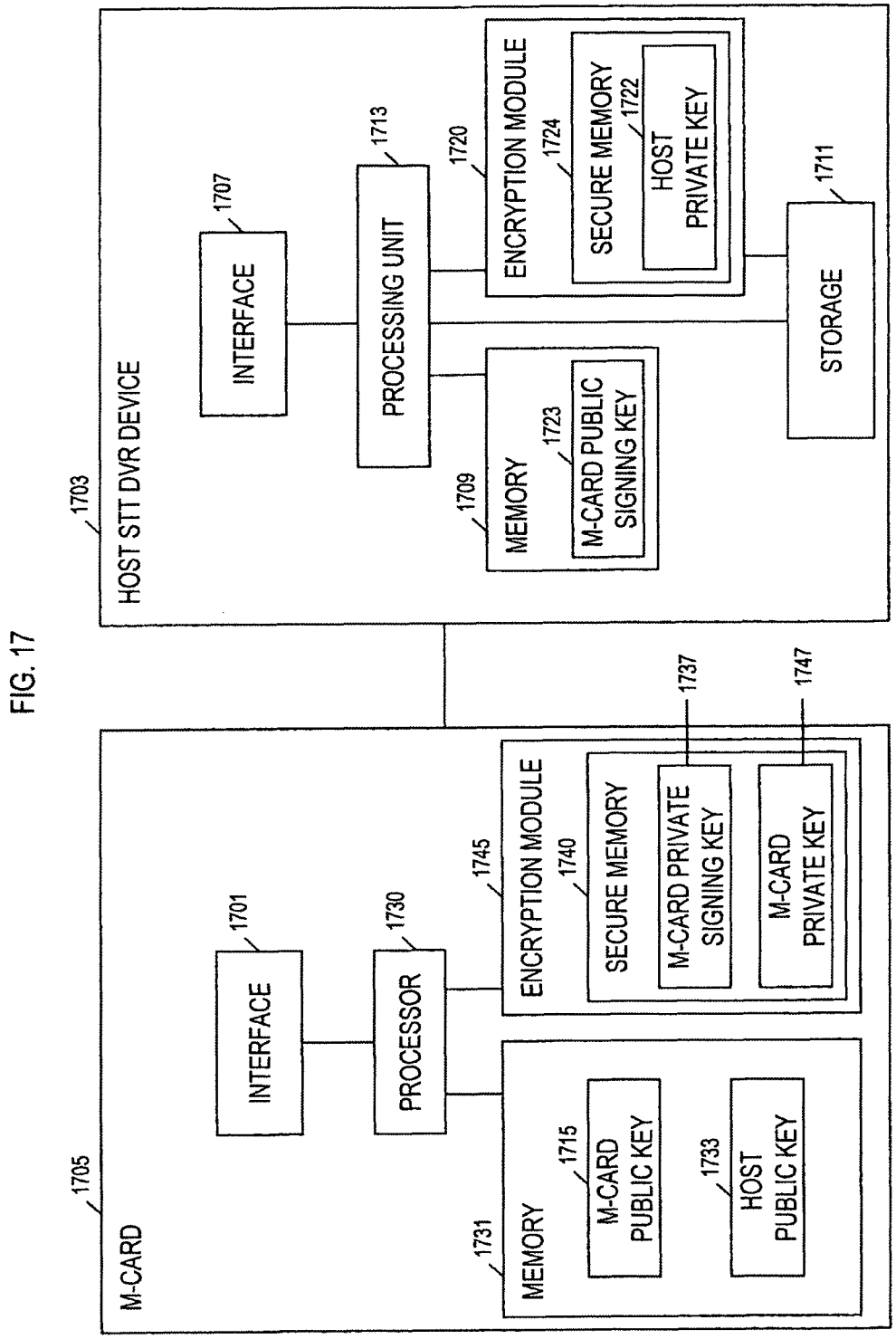
FIG. 17 illustrates an M-CARD connected with a host STT DVR device, in accordance with another embodiment of the invention.

FIG. 17 illustrates one such substitute host STT DVR device denoted 1703 connected to multi-stream CableCARD ("M-CARD") denoted 1705. M-CARD 1705 is capable of handling multiple streams, e.g., MPEG-2 program streams, from network 150, and is configured to operate with host STT DVR device 1703 which in this instance includes multiple tuners in interface 1707 for simultaneously tuning to different frequencies of carriers transporting multiple program streams, respectively. In this illustrative embodiment, in general, host DVR device 1703 assumes all of the functionalities of the above-described SDVR STT except, for example, generation of a content encryption key(s) (e.g., the aforementioned 3DES key(s)), processing of content management information (CMI) described below, and control of access to (e.g., playing, copying, archiving, etc.) a previously stored content file in device 1703, which functionalities have been removed to M-CARD 1705 here. Although the access to the stored content file is controlled by M-CARD 1705, host STT DVR device 1703 is responsible for the encryption and decryption of the content file. M-CARD 1705 also performs the conventional functions required of the prior art CableCARD. Because of the partition of the functionalities of the SDVR STT across device 1703 and M-CARD 1705, communications between device 1703 and M-CARD 1705 to realize the above-described SDVR STT functions are of interest here.

M-CARD 1705 includes interface 1701 for connection with interface 1707 of device 1703, in accordance with the PCMCIA standard. As mentioned before, M-CARD 1705 is responsible for the content key generation and control of access by device 1703 to protected content from network 150. Communications in which device 1703 requests such access and obtains such a content key generated from M-CARD 1705 will now be described. Like the SDVR STT, device 1703 needs to encrypt a content file using the content key before the content file is stored in storage 1711. However, like a PMD (e.g., 1260), device 1703 needs to be authenticated by M-CARD 1705 before the content file from network 150 can be recorded, and also needs to request recording privileges from M-CARD 1705.

Figure 18:
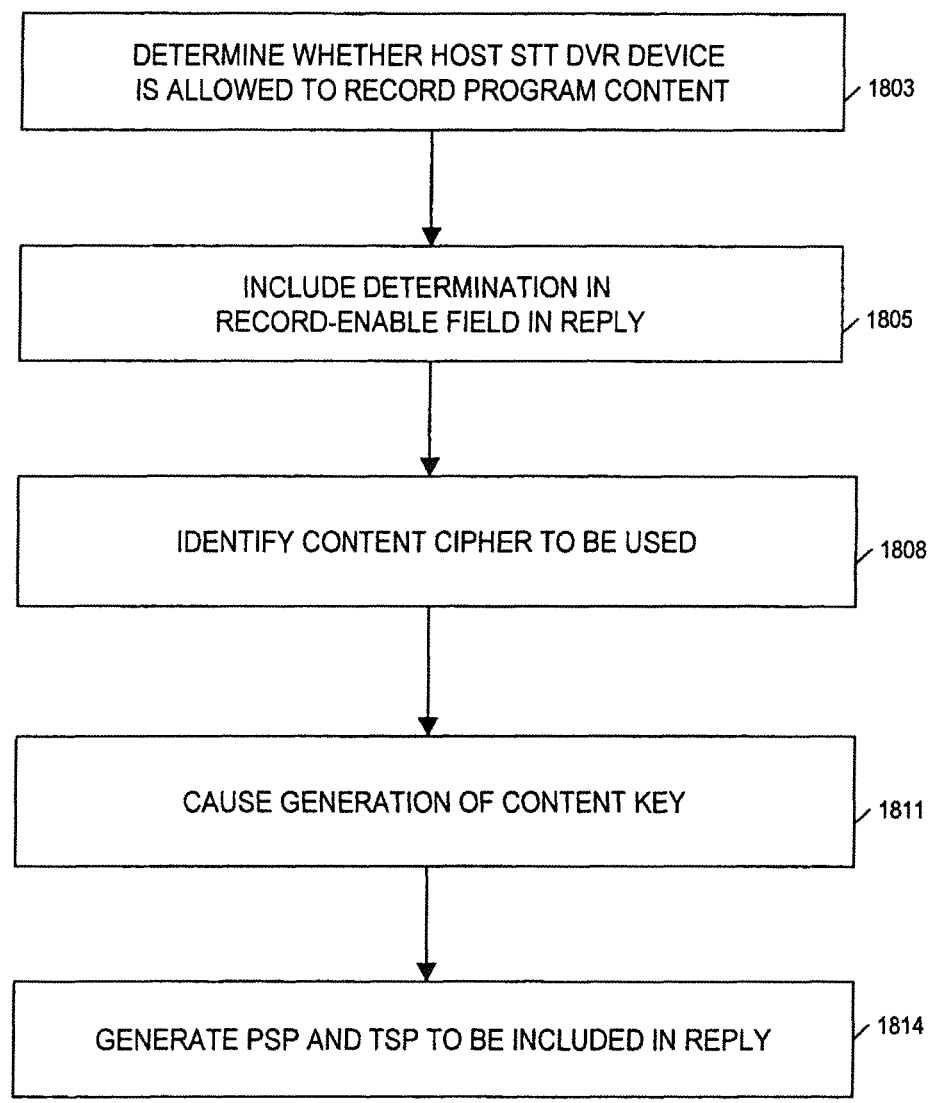
FIG. 18 is a flowchart depicting a process performed by the M-CARD for generating a reply to a Record request from the host STT DVR device, in accordance with the invention.

In response to a recording event which may be initiated by a user at device 1703 or automatically by device 1703, processing unit 1713 issues a Record request to M-CARD 1705. This Record request includes, among others, an index identifying the desired program to be recorded. FIG. 18 illustrates a process performed by processor 1730 in M-CARD 1705 for generating a Record reply to the received request. As shown in FIG. 18, at step 1803 processor 1730 determines whether host STT DVR device 1703 is allowed to record the program content in question, e.g., based on the security level of device 1703 relative to that of the program content. At step 1805 processor 1730 includes such a determination in a Record_Enable field in the reply. Processor 1703 at step 1808 identifies the content cipher to be used (e.g., 3DES, AES 128 cipher, etc.) for encrypting any file containing the program content in question. At step 1811, processor 1703 causes generation of a content key. Processor 1730 at step 1814 generates two security packages which are to be included in the reply, one of which, referred to as a "persistent security package (PSP)," is to be stored in association with any encrypted program content file in storage 1711. The other security package, referred to as a "temporary security package (TSP)," is for immediate consumption of device 1703 to encrypt the content file before it is stored in storage 1711. Both packages contain CMI for proper management of the content file by device 1703.

FIG. 19 illustrates PSP 1900 comprising M-CARD CMI 1903 and M-CARD signature 1905. CMI 1903 includes, among others, field 1908 which contains an M-CARD ID, which is unique and registered with the trusted licensing authority; field 1911 which contains a Host ID (i.e., the ID of device 1703 in this instance), which is also unique and registered with the trusted licensing authority; field 1913 which contains an identifier of the content cipher (e.g., 3DES, AES-128, etc.) to be used; and field 1915 which contains the content key which is generated by M-CARD 1705 and encrypted using an M-CARD public key 1715 in memory 1731. It should be noted at this point that the encrypted content key in field 1915 is analogous to encrypted content key V-1 (603) in SDVR STT 158-1. CMI 1903 also includes field 1918 which contains an identifier of the content security level; and field 1921 which contains usage rights to the content file in question (e.g., rights to play, copy, record, archive, etc.). M-CARD signature 1905 is generated by signing CMI 1903 using M-CARD private signing key 1737 in secure memory 1740, in accordance with a conventional encryption algorithm.

FIG. 20 illustrates TSP 2000 comprising host CMI 2003 and M-CARD signature 2005. CMI 2003 includes, among others, field 2008 which contains a Host ID (i.e., the ID of device 1703 in this instance); field 2011 which contains an identifier of the content cipher (e.g., 3DES, AES-128, etc.) to be used; and field 2013 which contains the aforementioned content key in field 1915, except that here it is encrypted using a host public key 1733 in memory 1731. M-Card signature 2005 is generated by signing CMI 2003 using M-CARD private signing key 1737, in accordance with a conventional encryption algorithm.

After receiving the Record reply, processing unit 1713 in device 1703 determines whether recording of the program content in question is permitted based on the value in the Record_Enable field in the reply. If not, unit 1713 may generate a message to inform the user of the denial of the Record request. Otherwise, unit 1713 verifies M-CARD signatures 1905 and 2005 in respective PSP 1900 and TSP 2000 using M-CARD public signing key 1723 stored in memory 1709. In addition, unit 1713 verifies that the host ID in field 2008 in TSP 2000 matches the ID of device 1703, which may be stored in memory 1709. Once PSP 1900 and TSP 2000 are verified, unit 1713 initiates the recording of the program content, and causes encryption module 1720 to decrypt the encrypted content key in field 2013 using host private key 1724 in secure memory 1722, which is the counterpart to host public key 1733. Unit 1713 causes encryption module 1720 to use the recovered content key to encrypt the recorded content. The resulting encrypted content file and the received PSP 1900 associated therewith are then stored in storage 1711.

Figure 21:
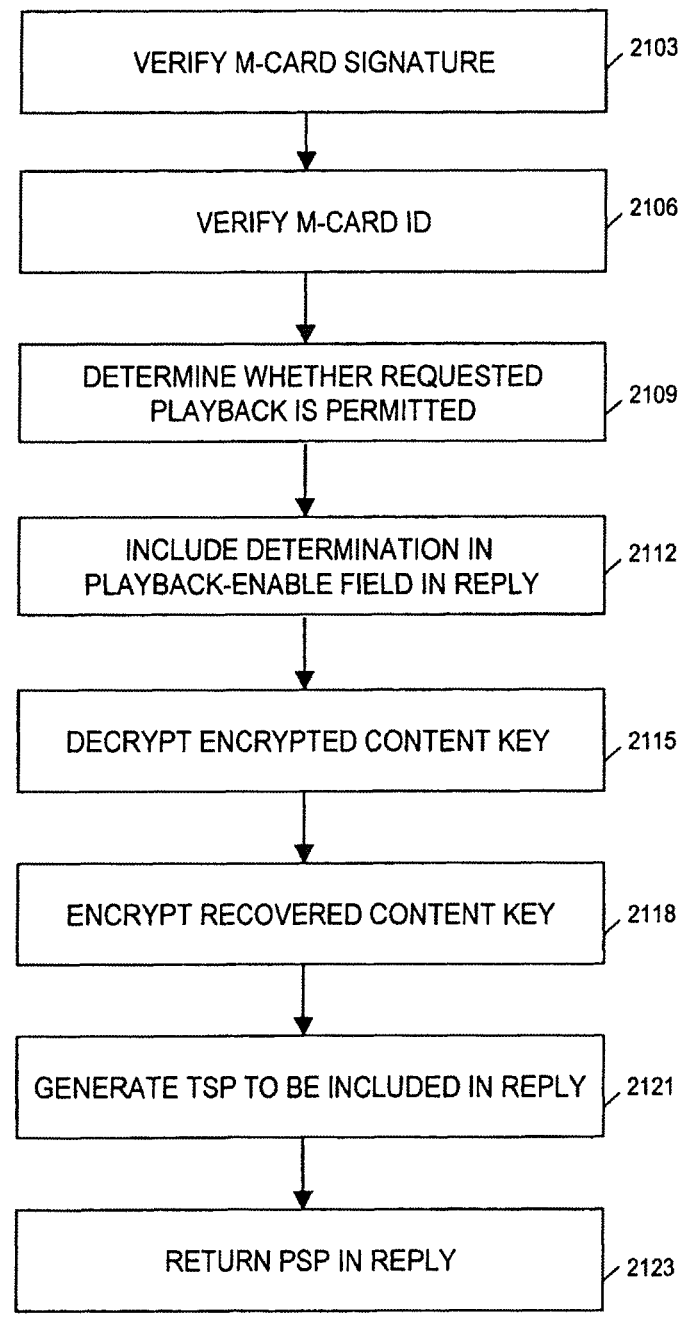
FIG. 21 is a flowchart depicting a process performed by the M-CARD for generating a reply to a Playback request from the host STT DVR device, in accordance with the invention.

In response to an event of playback of a stored content file in storage 1711, e.g., initiated by a user at device 1703, unit 1713 issues to M-CARD 1705 a Playback request, which contains PSP 1900 associated with the stored content file. FIG. 21 illustrates a process performed by processor 1730 in M-CARD 1705 for generating a Playback reply. Processor 1730 at step 2103 verifies the M-CARD signature 1905 in PSP 1900 using the M-CARD public signing key which is the counterpart to key 1737. Processor 1730 at step 2106 verifies that the M-CARD ID 1908 in PSP 1900 matches the ID of M-CARD 1705 which may be stored in memory 1731. Processor 1730 at step 2109 determines whether the requested playback is permitted, e.g., by checking usage rights field 1921 in PSP 900 which specifies any playback rights with respect to the associated content file. At step 2112 processor 1730 includes such a determination in a Playback_Enable field in the reply. Processor 1730 at step 2115 causes encryption module 1745 to decrypt the encrypted content key in field 1915 using M-CARD private key 1747 in secure memory 1740, which is the counterpart to M-CARD public key 1715. Processor 1730 at step 2118 encrypts the recovered content key using host public key 1733. At step 2121, based on selected information in PSP 1900 processor 1730 generates a TSP, e.g., TSP 2000, to be included in the reply, with the newly encrypted content key in field 2013. At step 2123, processor 1730 returns PSP 1900 in the reply to device 1703. It should be noted that, after generating the TSP, processor 1730 may modify PSP 1900 before it is returned to device 1703. However, the modified PSP needs to be re-signed because of the modified CMI 1903.

After receiving the Playback reply, processing unit 1713 in device 1703 determines whether playback of the program content in question is permitted based on the value in the Playback_Enable field in the reply. If not, unit 1713 may generate a message to inform the user of the denial of the Playback request. Otherwise, unit 1713 verifies M-CARD signatures 1905 and 2005 in respective PSP 1900 and TSP 2000 using M-CARD public signing key 1723. In addition, unit 1713 verifies that the host ID in field 2008 in TSP 2000 matches the ID of device 1703. Once PSP 1900 and TSP 2000 are verified, unit 1713 replaces the currently stored PSP associated with the encrypted content file to be played back with the received PSP. Unit 1713 causes encryption module 1720 to decrypt the encrypted content key in field 2013 of the received TSP using host private key 1724 in secure memory 1722, which is the counterpart to host public key 1733. Unit 1713 causes encryption module 1720 to use the recovered content key to decrypt the encrypted content file in question in storage 1711, and initiates a playback of the content file in the clear.

The foregoing merely illustrates the principles of the invention. It will thus be appreciated that those skilled in the art will be able to devise numerous other arrangements which embody the principles of the invention and are thus within its spirit and scope.

For example, the devices (e.g., trusted domain devices and/or PMDs) in the multi-layered rights arrangement in accordance with the invention may be connected to one another by a network, e.g., a home network whose technology has been employed to connect multiple STTs in different rooms of a home.

In addition, the devices in the multi-layered rights arrangement in accordance with the invention may not have internal storage for storing programming content therein. However, such devices may be connected to auxiliary storage to which the devices may deliver the content by transferring or streaming.

Further, in the embodiment shown in FIG. 1, the network transport is illustratively realized using HFC cable network 150. However, other networks such as digital subscriber line (DSL) networks, ethernet networks and satellite networks may be used, instead.

Finally, the system components of FIG. 1 are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A computer readable device having a storage medium and a hardware processor, the hardware processor configured to execute a plurality of instructions which are configured to, when executed:
    send to a module apparatus a request to record program content;
    receive from the module apparatus a response to the request to record, the response comprising:
        a data package comprising at least a version of a cryptographic element;
        a rights file configured to define one or more transfer rights configured to control a device's ability to provide the requested program content to other devices; and
        an indicator that the device associated to the request to record is allowed to record the requested program content based at least in part on a plurality of rules; and
    encrypt the program content with a second version of the cryptographic element derived from the data package;
    store the encrypted program content in association with the data package;
    register one or more display devices with the device based at least in part on a verification of data in a digital certificate provided by the one or more display devices;
    receive a request to transfer the encrypted program content to the one or more display devices;
    determine, before the encrypted content is transferred to the one or more display devices, whether an extent of security of the one or more display devices meets a certain one of the plurality of rules; and
    based on the determination, transfer the encrypted program content to the one or more display devices.

2. The computer readable device of claim 1, wherein the rights file comprises one or more of: a right to play and/or a right to record the requested program content.

3. The computer readable device of claim 1, wherein the rights file comprises a security level of the device.

4. The computer readable device of claim 1, wherein at least one of the plurality of rules concerns a period within which the one or more display devices may play the requested program content.

5. The computer readable device of claim 1, wherein the plurality of rules are instituted by a provider of the requested program content.

6. A method for use in a device connectable to a module apparatus, the device having storage therein, the method comprising:
    sending to the module apparatus a request to record a selected programming content;
    receiving from the module apparatus a response to the request, the response comprising:
        a data package containing at least an encrypted version of a first encryption key; and
        an indicator of a determination that the device is allowed to record the selected programming content, the determination based at least in part on a security measure associated with the selected programming content;
    based at least in part on the indicator of the determination, recording the selected programming content;
    encrypting the recorded programming content with a second encryption key, the second encryption key being derived from the encrypted version of the first encryption key contained within the data package;
    storing the encrypted programming content in association with the data package in the storage;
    authenticating one or more display devices registered with the device by verifying data in a digital certificate provided by individual ones of the one or more display devices; and
    based at least in part on said act of authenticating, making the encrypted programming content available to view on one or more display devices registered with the device.

7. The method of claim 6, wherein the indicator comprises a rights file.

8. The method of claim 7, wherein the rights file comprises a right of individual ones of the one or more display devices registered with the device to play the selected programming content.

9. The method of claim 6, wherein the selected programming content comprises movie content.

10. The method of claim 6, further comprising:
    determining whether the security measure meets a certain one of a plurality of rules associated with the selected programming content; and
    when the security measure meets the certain one of the plurality of rules, transferring the selected programming content to at least one of the one or more display devices.

11. The method of claim 10, wherein one of the plurality of rules comprises a number of times the device may transfer the selected programming content to the one or more display devices registered with the device.

12. The method of claim 10, wherein one of the plurality of rules specifies rights of the device to transfer the selected programming content to another device as a function of an extent of security of the other device.

13. A device connectable to a module apparatus, the device comprising:
    a processor which generates a request to record selected programming content;
    an interface which:
        transmits the request to the module apparatus; and
        receives, from the module apparatus, a response to the request, the response comprising a data package containing at least an encrypted version of a first encryption key, and a determination that the device is entitled to record the selected programming content based at least in part on at least one first security measure associated with the selected programming content, the selected programming content being recorded based on the determination;

an encryption apparatus which causes the processing unit to encrypt the recorded programming content with a second encryption key, the second encryption key being derived from the encrypted version of the first encryption key contained within the data package;

storage which stores the encrypted programming content in association with the data package therein; and logic which causes the interface to:
    authenticate the one or more second devices via verification of data in a digital certificate provided by individual ones of the one or more second devices; and
    transfer the recorded programming content to one or more second devices in communication therewith via at least one in band transmission channel of a hybrid fiber coaxial (HFC) network, only when it is determined that the first security measure meets a certain one of a plurality of rules.

14. The device of claim 13, wherein the determination that the device is entitled to record the selected programming content is further based on a security level associated with the device.

15. The device of claim 13, wherein the plurality of rules is instituted by an operator of the HFC network.

16. The device of claim 13, wherein the logic further determines whether the at least one first security measure associated with the selected programming content meets the certain one of a plurality of rules.

17. The device of claim 13, wherein the interface provides data communication between the module apparatus and the device.

* * * * *